US012530978B1

(12) United States Patent
Bog et al.

(10) Patent No.: US 12,530,978 B1
(45) Date of Patent: Jan. 20, 2026

(54) OPTIMIZED SCHEDULE CONSTRUCTION AND MODIFICATION FOR ON-DEMAND PRIVATE AVIATION OPERATOR

(71) Applicant: Wheels Up Partners Holdings LLC, New York, NY (US)

(72) Inventors: Suat Bog, Los Angeles, CA (US); Yu-Heng Chang, Austin, TX (US); Izzy Doctor, Los Angeles, CA (US)

(73) Assignee: Wheels Up Partners Holdings LLC, New York, NY (US)

( * ) Notice: Subject to any disclaimer, the term of this patent is extended or adjusted under 35 U.S.C. 154(b) by 0 days.

(21) Appl. No.: 19/005,840

(22) Filed: Dec. 30, 2024

(51) Int. Cl.
G06Q 50/40 (2024.01)
G06Q 10/047 (2023.01)
G08G 5/32 (2025.01)

(52) U.S. Cl.
CPC ............ *G08G 5/32* (2025.01); *G06Q 10/047* (2013.01); *G06Q 50/40* (2024.01)

(58) Field of Classification Search
CPC ........ G06Q 10/02; G06Q 50/14; G06Q 50/40; G08G 5/34
See application file for complete search history.

(56) References Cited

U.S. PATENT DOCUMENTS

| | | | |
|---|---|---|---|
| 7,228,207 B2 | 6/2007 | Clarke et al. | |
| 8,874,459 B1* | 10/2014 | Green | G06Q 10/08 |
| | | | 701/120 |
| 9,116,007 B2 | 8/2015 | Griffiths | |
| 2008/0133304 A1 | 6/2008 | Clarke et al. | |
| 2009/0119135 A1* | 5/2009 | Schoeman | G06Q 10/02 |
| | | | 705/5 |
| 2017/0032682 A1* | 2/2017 | Moser | G06Q 50/40 |
| 2018/0082597 A1* | 3/2018 | Nicol | G08G 5/26 |
| 2018/0204467 A1* | 7/2018 | Crump | G06Q 30/0206 |
| 2022/0245741 A1* | 8/2022 | Fisher | G06Q 30/0627 |

(Continued)

OTHER PUBLICATIONS

Eltoukhy, et al., Airline schedule planning: a review and future directions, Industrial Management & Data Systems, vol. 117, No. 6, 2017, pp. 1201-1243 (Year: 2017).*

(Continued)

*Primary Examiner* — Daniel Vetter
(74) *Attorney, Agent, or Firm* — Pearl Cohen Zedek Latzer Baratz LLP

(57) ABSTRACT

Computer implemented methods and systems construct and modify a schedule for an on-demand private aviation operator. Demand and supply information for one or more specific days in the future are obtained and used by a construction algorithm to construct a schedule for the one or more specific days that assigns respective aircraft to respective aircraft routes that include flight legs, assigns respective crew members to respective aircraft routes or flight legs thereof, to satisfy flight demands, while complying with constraints and achieving specified objective(s) of the construction algorithm. Thereafter, in response to receiving an indication of a change to the supply and/or demand information that warrants a modification to the schedule, an improvement algorithm is used to modify a portion of the schedule to address the change while complying with the constraints and achieving specified objective(s) of the improvement algorithm.

21 Claims, 10 Drawing Sheets

(56) References Cited

U.S. PATENT DOCUMENTS

2023/0230111 A1* 7/2023 Nagalla .................. G06N 3/08
705/7.31

OTHER PUBLICATIONS

Medard, et al., Airline crew scheduling from planning to operations, European journal of operational research, vol. 183, No. 3, 2007, pp. 1013-1027 (Year: 2007).*

Ageeva, Approaches to incorporating robustness into airline scheduling, Diss. Massachusetts Institute of Technology, 2000 (Year: 2000).*

Xu et al., "Airline scheduling optimization: literature review and a discussion of modelling methodologies," Intelligent Transportation Infrastructure, Oxford University Press, Nov. 2023, 24 pages.

Yao, et al., "Crew Pairing and Aircraft Routing for On-Demand Aviation with Time Window," International Journal of the Computer, the Internet and Management, vol. 3, No. 2, Oct. 2005, 4 pages.

Yao, et al., "Aircraft Scheduling with Maintenance and Crew Consideration," American Institute of Aeronautics and Astronautics, SSRN Electric Journal, Sep. 2005, 6 pages.

Yao, et al., "Strategic Planning in Fractional Aircraft Ownership Programs," European Journal of Operational Research, vol. 189, Issue 2, Sep. 2008, 24 pages.

Yao, "Topics in Fractional Airlines," Dissertation presented to The Academic Faculty, School of Industrial and Systems Engineering, Georgia Institute of Technology, May 2007, 132 pages.

Yao, et al., "Integrated Model for the Dynamic On-Demand Air Transportation Operations," Chapter 5, Dynamic Fleet Management, 2007, 17 pages.

Yao, et al., "Aircraft and crew scheduling problems in on-demand air transportation services," Abstract only, [https://www.researchgate.net/publication/289709634_Aircraft_and_crew_scheduling_problems_in_on-demand_air_transporation_services], downloaded on Jan. 9, 2025, 3 pages.

Yang, Wei, et al., "Aircraft and crew scheduling for fractional ownership programs," Annals of Operations Research, Mar. 2008, 18 pages.

* cited by examiner

OPTIMIZED SCHEDULE CONSTRUCTION AND MODIFICATION FOR ON-DEMAND PRIVATE AVIATION OPERATOR

FIELD OF TECHNOLOGY

Embodiments described herein generally relate to computer implemented methods and systems for constructing and modifying a schedule for an on-demand private aviation operator.

BACKGROUND

A commercial airline operator typically prepares their flight schedules many months in advance, and customers of the commercial airline operator are only able to select among the days, times, and aircraft routes that are offered in such schedules offered by the commercial airline operator. If none of the scheduled days, times and/or aircraft routes of a commercial airline operator meets the needs of one of its customer, the customer may check whether another commercial airline operator has a scheduled aircraft route that better meets the needs of the customer. If none of the commercial airline operators meets the specific needs of the customer, then the customer may settle for a flight that is inconvenient for the customer, requires the customer to fly to or from a destination a day early or a day late and/or requires the customer complete a portion of their travel using ground transportation following and/or preceding a flight leg in order to get the customer to their desired destination on their desired day and at their desired time.

In contrast to a commercial airline operator, an on-demand private aviation operator may allow its customers to specify when and where they want to travel, and then the on-demand private aviation operator can customize their flight schedules to meet the specific needs of its customers. Customizing such flight schedules to meet (aka satisfy) the specific needs of the customers while also satisfying various constraints and optimizing various objectives may require solving a very complex mathematical problem that if attempted to be solved using a brute force optimization algorithm is computationally intractable, i.e., NP hard.

SUMMARY

Certain embodiments of the present technology are directed to a computer implemented method performed by one or more processors for constructing and modifying a schedule for an on-demand private aviation operator. The computer implemented method comprises, obtaining and/or accessing demand information including a respective flight demand for each customer of a plurality of customers that have requested to fly from a respective departure location to a respective destination location departing at a respective time and day of one or more specific days in the future, and obtaining and/or accessing supply information including a respective availability for each of a plurality of aircraft and for each of a plurality of crew members on the one or more specific days in the future. The method also includes using a construction algorithm to construct a schedule for the one or more specific days in the future that satisfies the flight demands of the customers and optimizes the schedule to achieve one or more objectives of the construction algorithm while complying with constraints related to the aircraft, the crew members, and the customers. The schedule constructed using the construction algorithm assigns respective aircraft to respective aircraft routes each of which includes one or more flight legs, and assigns respective crew members to the respective aircraft routes or one or more of the flight legs thereof. Each flight leg of each aircraft route may be used to satisfy at least a portion of a flight demand of a customer. The method also includes, on one of the one or more specific days or within a specified temporal period prior thereto, receiving an indication of a change to at least one of the supply information or the demand information that warrants a modification to the schedule, and in response thereto, using an improvement algorithm to modify a portion of the schedule to achieve one or more objectives of the improvement algorithm while complying with the constraints related to the aircraft, the crew members, and the customers. The improvement algorithm differs from the construction algorithm.

In accordance with certain embodiments, using the construction algorithm to construct the schedule for the one or more specific days in the future, comprises: performing route enumeration to produce a list of feasible aircraft routes that can be used to satisfy the flight demands of the plurality of customers on the one or more specific days using those of the plurality of aircraft available on the one or more specific days; performing route selection to select, from the list of feasible aircraft routes produced as a result of performing the route enumeration, a shortened list of the feasible aircraft routes that can be used to satisfy the flight demands of the plurality of customers on the one or more specific days using those of the plurality of crew members available on the one or more the specific days; and performing route optimization to select, from the shortened list of the feasible aircraft routes, a respective single aircraft route for each of the aircraft included in the schedule, respective crew members for each of the respective flight legs, and a respective single flight leg for each of the flight demands of the plurality of customers, wherein the route optimization optimizes the schedule to achieve the one or more objectives of the construction algorithm while complying with the constraints related to the aircraft, the crew members, and the customers.

In accordance with certain embodiments, the one or more objectives of the construction algorithm include one or more of the following: maximize revenues; minimize costs; maximize profits; minimize flight legs that do not fly any of the customers; minimize how many of the crew members are used to satisfy the flight demands of the plurality of customers; minimize how many of the aircraft are used to satisfy the flight demands of the plurality of customers; maximize lifetime values of customers; and minimize delays. The one or more objectives of the improvement algorithm optionally includes minimizing changes to the schedule constructed using the construction algorithm.

In accordance with certain embodiments, using the improvement algorithm comprises: constructing a graph data model including nodes, node layers, and arcs, wherein each of the nodes in the graph data model corresponds to a respective flight demand, wherein each of the node layers in the graph data model corresponds to a respective aircraft route that can be used to satisfy one or more of the flight demands, and wherein the arcs in the graph data model define links between pairs of the nodes included in different ones of the node layers. Additionally, using the improvement algorithm comprises performing a neighborhood search on the graph data model, which includes iteratively identifying improvements in the graph data model by iteratively identifying one or more negative cost cycles (NCCs) until a specified criterion is satisfied.

In accordance with certain embodiments, constructing the graph data model comprises: generating an initial feasible solution (IFS) that can be used to satisfy a said flight demand for a said customer that is in recovery because of a disruption; creating and populating the node layers and the nodes of the graph data model such that one of the node layers corresponds to an aircraft route that can be used to satisfy the said flight demand that is in recovery, and such that one of the nodes corresponds to the said flight demand that is in recovery; and constructing all feasible arcs between different ones of the nodes included in different ones of the node layers.

In accordance with certain embodiments, using the improvement algorithm to modify a portion of the schedule for the one or more specific days comprises one or more of the following: identifying a replacement aircraft to replace one of the aircraft that became at least one of grounded, delayed, or infeasible; identifying a replacement crew member to replace one of the crew members that became unavailable; assigning an aircraft that had previously been unavailable to an aircraft route; assigning a crew member that had previously been unavailable to an aircraft route or one or more flight legs thereof; canceling an aircraft route or one or more flight legs thereof that became unnecessary; canceling an assignment for at least one of the crew members that became unnecessary; swapping assignments for at least some of the crew members; swapping assignments for at least some of the aircraft; or assigning at least one of the flight demands for at least one of the customers to a third party aircraft.

In accordance with certain embodiments, after the construction algorithm has been used to construct the schedule for one or more specific days in the future, and at least the specified temporal period prior to at least one of the one or more specific days in the future, causing providing to each respective customer of the plurality of customers respective information about the respective flight leg that has been scheduled to fly the customer from the respective departure location to the respective destination location on one of the one or more specific days. Additionally, after the improvement algorithm has been used to modify a portion of the schedule, causing providing to each respective customer whose respective flight leg has been changed as a result of the using the improvement algorithm, respective updated information about an updated respective flight leg that has been scheduled to fly the customer from the respective departure location to the respective destination location on one of the one or more specific days.

In accordance with certain embodiments, after the construction algorithm has been used to construct the schedule for one or more specific days in the future, and at least the specified temporal period prior to at least one of the one or more specific days in the future, causing providing, to each respective crew member of the plurality of crew members that are included on the schedule, information about the respective aircraft route or one or more flight legs thereof to which the crew member has been assigned. Additionally, after the improvement algorithm has been used to modify a portion of the schedule, causing providing to each respective crew member of the plurality of crew members whose respective aircraft route or one or more flight legs thereof has been changed as a result of the using the improvement algorithm, respective updated information about an updated aircraft route or one or more flight legs thereof to which the crew member has been assigned.

In accordance with certain embodiments, the method also includes at multiple times preceding the specified temporal period prior to the one or more specific days, between which times the demand information and the supply information are updated, using the construction algorithm to construct prior versions of the schedule for the one or more specific days in the future and causing displaying of at least a portion of one or more of the prior versions of the schedule to a representative of the on-demand private aviation operator along with information related to the one or more objectives of the construction algorithm. Additionally, the method includes allowing the representative of the on-demand private aviation operator to lock-in one or more portions of one or more prior versions of the schedule such that the one or more portions that are locked-in by the representative of the on-demand private aviation operator are included in the schedule for the one or more specific days in the future.

In accordance with certain embodiments, the constraints related to the aircraft, the crew members, and the customers include hard constraints and optionally also include one or more soft constraints.

Certain embodiments of the present technology are directed to a system for constructing a schedule for an on-demand private aviation operator and recovering from one or more disruptions thereto. The system comprises a data store that stores demand information and supply information, the demand information including a respective flight demand for each customer of a plurality of customers that have requested to fly from a respective departure location to a respective destination location departing at a respective time and day of one or more specific days in the future, and the supply information including a respective availability for each of a plurality of aircraft and for each of a plurality of crew members on the one or more specific days in the future. The system also includes one or more processors interfaced with the data store and configured to construct a schedule, using a construction algorithm, for the one or more specific days in the future that satisfies the flight demands of the customers and optimizes the schedule to achieve one or more objectives of the construction algorithm while complying with constraints related to the aircraft, the crew members, and the customers. The schedule constructed using the construction algorithm assigns respective aircraft to respective aircraft routes each of which includes one or more flight legs, and assigns respective crew members to the respective aircraft routes or one or more of the flight legs thereof. Each said flight leg of each of said aircraft route may be used to satisfy at least a portion of a said flight demand of a said customer. The one or more processors are also configured to, on one of the one or more specific days or within a specified temporal period prior thereto, in response to receiving an indication of a change to at least one of the supply information or the demand information that warrants a modification to the schedule, use an improvement algorithm to modify a portion of the schedule to achieve one or more objectives of the improvement algorithm while complying with the constraints related to the aircraft, the crew members, and the customers. The improvement algorithm differs from the construction algorithm.

Certain embodiments of the present technology are directed to a non-transitory computer readable medium comprising a plurality of instructions stored thereon and executable by at least one processor, the plurality of instructions for constructing a schedule for an on-demand private aviation operator and recovering from one or more disruptions thereto, the plurality of instructions comprising: instructions for at least one of obtaining or accessing demand information including a respective flight demand for each customer of a plurality of customers that have requested to fly from a respective departure location to a respective destination location departing at a respective time and day of one or more specific days in the future; instructions for at least one of obtaining or accessing supply information including a respective availability for each of a plurality of aircraft and for each of a plurality of crew members on the one or more specific days in the future; instructions for using a construction algorithm to construct a schedule for the one or more specific days in the future that satisfies the flight demands of the customers and optimizes the schedule to achieve one or more objectives of the construction algorithm while complying with constraints related to the aircraft, the crew members, and the customers; wherein the schedule constructed using the construction algorithm assigns respective aircraft to respective aircraft routes each of which includes one or more flight legs, and assigns respective crew members to the respective aircraft routes or one or more of the flight legs thereof; and wherein each said flight leg of each of said aircraft route may be used to satisfy at least a portion of a said flight demand of a said customer; and instructions for, on one of the one or more specific days or within a specified temporal period prior thereto, receiving an indication of a change to at least one of the supply information or the demand information that warrants a modification to the schedule, using an improvement algorithm to modify a portion of the schedule to achieve one or more objectives of the improvement algorithm while complying with the constraints related to the aircraft, the crew members, and the customers; wherein the improvement algorithm differs from the construction algorithm.

This summary is not intended to be a complete description of the embodiments of the present technology. Other features and advantages of the embodiments of the present technology will appear from the following description in which the preferred embodiments have been set forth in detail, in conjunction with the accompanying drawings and claims.

DETAILED DESCRIPTION

Figure 1:
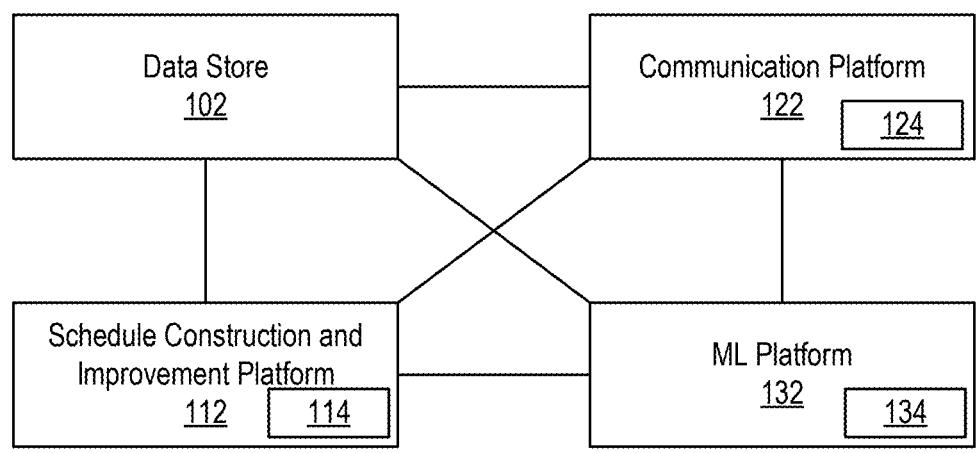
FIG. 1 is a high level block diagram that provides example details of a planning and scheduling platform for an on-demand private aviation operator, according to an embodiment of the present technology.

FIG. 1 provides example details of a computer implemented system 100 of an on-demand private aviation operator, according to an embodiment of the present technology. Referring to FIG. 1, computer implemented system 100 is shown as including data store 102, schedule construction and improvement platform 112, communication platform 122, and machine learning (ML) platform 132. The schedule construction and improvement platform 112, communication platform 122, and ML platform 132 are shown as including respective processors 114, 124, and 134. Different processors can be used to implement the schedule construction and improvement platform 112, the customer communication platform 122, and the ML platform 132. In other words, the processors 114, 124, and 134 can differ from one another. Alternatively the same processors, or at least some of the same processors, can be used to implement the schedule construction and improvement platform 112, the customer communication platform 122, and the ML platform 132. In other words, the processors 114, 124, and 134 can be the same processors, or at least some of the processors 114, 124, and 134 can be the same processors.

The data store 102 can include one or more databases that store various types of information, including, but not limited to, demand information, supply information, and constraint information. The data store 102 can, e.g., include a data lake that stores raw unstructured data and a data warehouse that stores structured and filtered data that has already been processed for one or more purposes. The data store 102 can be implemented using cloud and/or non-cloud based storage. In accordance with certain embodiments, certain types of information (e.g., certain types of customer information) stored in the data store 102, can be features and feature values that are determined by one or more ML models implemented within the ML platform 132.

The demand information can include for each day in the future (of a plurality of days in the future) a respective flight demand for each customer of a plurality of customers that have requested to fly from a respective departure location (e.g., a first airport) to a respective destination location (e.g., a second airport) departing at a respective time and day of one or more specified days (e.g., one of two consecutive days) in the future. The respective flight demand for a customer can be a flight itinerary created by the customer on a website or application (app) of the on-demand private aviation operator. For example, such a flight itinerary can be requested by a customer using the website or app and may specify an aircraft type, an aircraft cabin type, a date and time of departure, a departing airport, and a destination airport (aka arriving airport), and/or the like. In response to the flight itinerary request being received, the website or app can quote a price for the flight itinerary and the customer is given the option to book the flight itinerary by confirming all details and accepting the quoted price and agreeing to all applicable terms and conditions. The type of requests that a customer can make when submitting a flight itinerary request may depend upon whether the customer has a membership with the on-demand private aviation operator, and if so, the level of the membership. The flight itinerary, and more generally the flight demand of a customer, can be considered confirmed at that point, after which changes and/or cancellations may be subject to change conditions and fees and/or cancellations conditions and fees that were agreed to by the customer.

Such demand information can be updated over time as additional customers add new flight demand and/or modify their previous flight demand. For example, for a specific departure day (aka date) in the future, 30 days prior to that departure day a relatively small amount of flight demand may exist for that day, but as time progresses and that day in the future becomes closer to a present day, more and more flight demand will exist. For the following discussion, it can be assumed that flight demand for a specific day in the future is considered substantially fixed a specified amount of time (e.g., 48 hours) prior to that day, assuming that customers are required to submit a flight itinerary request at least the specified amount of time in advance to be guaranteed a flight. This is not to say that one or more additional flight itinerary requests cannot be requested and accepted after that time, assuming excess supply (e.g., available aircraft and available crew members) is available to accommodate such additional flight itinerary requests.

The supply information can include aircraft supply information and crew member supply information. The aircraft supply information can include for each day in the future, of a plurality of days in the future, a respective availability for each of a plurality of aircraft on the day in the future. Such aircraft can be owned or leased by the on-demand private aviation operator or can otherwise be part of the fleet of aircraft available for use by the on-demand private aviation operator, which fleet is used to satisfy the aforementioned flight demand. The aircraft supply information can also include information about each of the aircraft including, for example, the cabin type of the aircraft (e.g., small, light, premium, midsize, super midsize, large cabin, and ultra-long-range, but not limited thereto), the capacity of the aircraft (i.e., the number of seats available to customers), and/or the like.

The crew member supply information can include for each day in the future, of a plurality of days in the future, a respective availably of each of a plurality of crew members on the day in the future. For each crew member, the crew member supply information can also include information about the type of the crew member, including whether the crew member is a pilot, and/or the like. For a pilot, the crew member supply information can specify the type(s) of aircraft the pilot is licensed to fly, as well as whether the pilot is licensed to be a captain (aka, the primary in command (PIC)), or licensed to be a first officer (i.e., the second in command (SIC)), the home base for the pilot, and/or the like. The aircraft supply and the crew member supply that is available for a specified day in the future can also be referred to as the assets available for the specified day. In certain embodiments, whenever an aircraft is used to satisfy a flight demand, there must be two pilots assigned to the aircraft, at least one of which is licensed to be the PIC (aka captain) and the other of which can be the SIC (aka first officer).

The constraint information can specify constraints related to aircraft, crew members, and customers. For example, constraint information related to an aircraft can specify the type of pilot license required to fly the aircraft, the distance the aircraft can fly before needing to refuel, the distance the aircraft can fly before needing an inspection and/or other types of maintenance, the number of passengers the aircraft can carry, the number of crew members needed to operate the aircraft, and/or the like. Constraint information related to crew members can, e.g., specify how many hours specific types of crew members are allowed to work without a break, how often specific types of crew members are required to be given breaks, how many hours specific types of crew members are allowed to work during a week or month, whether specific types of crew members are required to end their shift at their home base, and/or the like. Constraint information related to customers can, e.g., specify how long customers can be delayed relative to their requested departure, specific levels of service that are to be provided to specific customers, how long customers are allowed to remain in an aircraft on a tarmac, and/or the like.

The above are examples of the types of information that can be stored in the data store 102, which are not meant to be all encompassing. The data store 102 can store alternative and/or additional types of information. For example, the data store 102 can also store other types of customer information, besides customer's flight demand information, such as whether or not the customer has a membership with the private aviation company (and if so, a level of the customer's membership), the customer's home address, the customer's billing address, the customer's contact information (e.g., email address, phone number), and/or the like. The data store can additionally store a lifetime value (LTV) for each customer that is a member of the on-demand private aviation operator, which enables the LTVs of customers to be used when scheduling aircraft routes and assigning customers to specific types of aircraft. For example, if a customer has been a member for many years and flies once per week they can have a higher LTV than a relatively new customer that only flies once every three months. In accordance with certain embodiments, the LTV of each customer, of a plurality of customers, is determined using a machine learning (ML) model implemented on the ML platform 132, and then stored in the data store 102. In such an embodiment, when the LTV of a customer is updated, the updated LTV of the customer can replace or supplement the previously stored LTV of the customer in the data store 102. The term customer lifetime value, as used herein, can be used to refer the LTV of a plurality of customers.

For another example, the data store 102 can also store other types of aircraft information, such as information about predictions of how long it will take various types of aircraft to complete a flight leg. In accordance with certain embodiments, such predictions, which can also be referred to as predicted flight times, can be determined using a ML model implemented on the ML platform 132, and then stored in the data store. In such an embodiment, when the predicted flight times are updated, e.g., due to new calibrations and observations, and/or the like, the updated predicted flight times can replace or supplement the previously stored predicted flight times in the data store 102.

The schedule construction and improvement platform 112 can include service applications implemented by one or more processors 114 to perform services that are offered by the system 100. An example service includes a schedule construction service, implemented using a construction algorithm, that constructs a schedule for each day, of a plurality of days in the future. As will be described in additional detail below, such a constructed schedule can assign respective aircraft to respective aircraft routes each of which includes one or more flight legs, assign respective crew members to the respective aircraft routes or one or more of the flight legs thereof, wherein each of the one or more flight legs of each of the aircraft routes can be used to satisfy at least a portion of the flight demand for one of the customers. Another example service (that can be performed by the schedule construction and improvement platform 112) is an improvement service implemented using an improvement algorithm that modifies a portion of a previously constructed schedule in the event of a disruption to at least one of the aircraft or the crew members that causes at least a portion of the schedule constructed using the construction algorithm to be infeasible, unnecessary, or improvable, necessitating adjustments for re-optimization. More generally, the improvement algorithm can be used to address one or more changes to the supply and/or demand information that warrants one or more modifications to the schedule. Additional details of the aforementioned construction algorithm and aforementioned improvement algorithm are described below.

Still referring to FIG. 1, the communication platform 122 can include communication applications implemented by one or more processors 124 to provide communications with customers, crew members, mechanics, and/or any other entities with which it is useful to communicate. For example, the communication platform 122 can be used to receive flight demand requests from customers, to inform customers of aircraft to which the costumers are assigned, to notify customers when their flight legs have been modified as the result of one or more previously schedule flight legs becoming infeasible or otherwise being changed. The communication platform 122 can also be used to communicate with crew members, e.g., to inform crew members of aircraft routes and/or flight legs to which the crew members are assigned, to notify crew members when aircraft routes and/or flight legs to which the crew members were previously assigned have been modified, to receive notifications from crew members that they are sick or otherwise unavailable to work on specific days, and/or the like. The communication platform 122 may also be used to communicate with third party (3P) aviation operators from which the on-demand private aviation operator may purchase excess capacity (aka supply) on the spot market or under some other arrangement.

Still referring to FIG. 1, the ML platform 132 can include machine learning applications implemented by one or more processors 134 that implement ML models. In accordance with certain embodiments, one such ML model can determine a respective lifetime value (LTV) for each customer that flies with the on-demand private aviation company, and can update the LTV for each customer from time to time. In accordance with certain embodiments, one such ML model can predict flight times, and can update predicted flight times from time to time.

Figure 2:
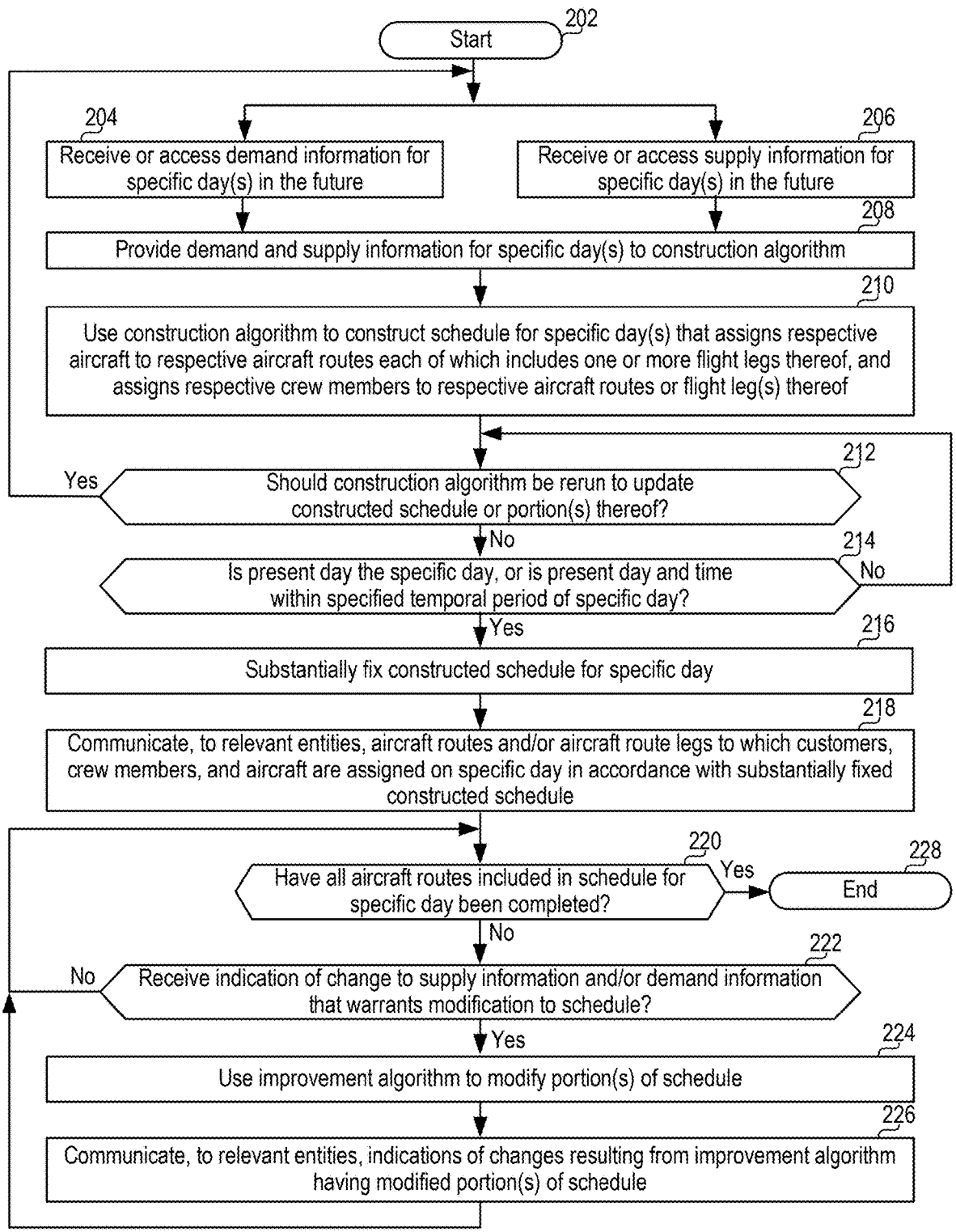
FIG. 2 is a high level flow diagram used to summarize a computer implemented method for constructing a schedule for an on-demand private aviation operator and recovering from one or more disruptions thereto, in accordance with certain embodiments of the present technology.

The high level flow diagram of FIG. 2 will now be used to summarize a computer implemented method for constructing a schedule for an on-demand private aviation operator and recovering from one or more disruptions thereto, in accordance with certain embodiments of the present technology. The method summarized with reference to FIG. 2 can be performed by one or more processors, e.g., the processor(s) 114 described above with reference to FIG. 1.

Referring to FIG. 2, the method is shown as starting at step 202, which can occur, e.g., a number of days prior to (e.g., 10 days prior to) one or more specific days in the future (e.g., 10 days in the future) for which planning and scheduling is to be performed for the on-demand private aviation operator. Once started, steps 204 and 206 are performed in parallel as shown or serially. Step 204 involves receiving or accessing demand information including a respective flight demand for each customer of a plurality of customers that has requested to fly from a respective departure location to a respective destination location departing at a respective time and day of one or more specific days (e.g., one of two consecutive days) in the future. Step 206 involves receiving or accessing supply information including respective availability for each of a plurality of aircraft and for each of a plurality of crew members on the one or more specific days in the future. In an embodiment, the demand information that is received or accessed at step 204, and the supply information that is received or accessed at step 206, can be received or accessed from a data store, such as the data store 102 discussed above with reference to FIG. 1. While steps 204 and 206 are described as being two separate steps, such steps can be the same step or separated into additional steps (e.g., sub-steps), depending upon the specific implementation.

Still referring to FIG. 2, step 208 involves providing the demand information and the supply information for the specific day(s) in the future (e.g., a day that is 10 days in the future, or two consecutive days that are 10 and 11 days in the future) to a construction algorithm. In accordance with an embodiment, step 208 can include mapping data objects from input snapshot data to specified objects in a data layer to make such data readily accessible and useable by algorithms of the present technology, including construction and improvement algorithms described herein and steps thereof.

Step 210 involves using (including executing) the construction algorithm to construct a schedule for the specific day in the future that assigns respective aircraft to respective aircraft routes each of which includes one or more flight legs, assigns respective crew members to the respective aircraft routes or one or more of the flight legs thereof, wherein each of the one or more flight legs of each of the aircraft routes can be used to satisfy at least a portion of the flight demand for one of the customers. Each aircraft route specifies a starting airport of the aircraft route and an ending airport of the aircraft route, as well as the one or more flight legs of the aircraft route. For example, an aircraft route ABCDA, which can of course be named in a different manner, can include a flight leg AB (which corresponds to an aircraft traveling from airport A to airport B), a flight leg BC (which corresponds to the aircraft thereafter traveling from airport B to airport C), a flight leg CD (which corresponds to the aircraft thereafter traveling from airport C to airport D), and a flight leg DA (which corresponds to the aircraft thereafter traveling from airport D back to airport A). From the above example, it should be appreciated that the starting and ending airports of an aircraft route can be the same, if the aircraft returns to where it started at the end of its route, however that need not be the case. From the above example, it should be appreciated that an aircraft route that includes multiple flight legs can be used to satisfy the flight demands of multiple customers. Continuing with the above example of the aircraft route ABCDA, the flight leg AB can be used to satisfy the flight demand of a first customer, the flight leg BC can be used to satisfy the flight demand of a second customer, the flight leg CD can be used to satisfy the flight demand of a third customer, and the flight leg DA can be used to satisfy the flight demand of a fourth customer. It is also possible the multiple flight legs of the same aircraft route are used to satisfy the flight demand of the same customer, e.g., if the customer requests to fly from airport A to airport B, at which another passenger (that is part of the customer's group) is picked up, and then to fly from airport B to airport C. There are other reasons that multiple flight legs of the same aircraft route can be used to satisfy the flight demand of the same customer, e.g., if an aircraft needs to temporarily land at an airport to refuel and/or swap one or more crew members. Further, it is noted that one or more flight legs of a scheduled aircraft route may be devoid of a customer, but rather, may be required to transport an airplane from one airport to another airport at which another customer is picked up. A flight leg that does not fly any customer, i.e., that is devoid of a customer, can be referred to herein as an empty flight leg. While an objective may be to minimize empty flight legs, it sometimes may be necessary for an aircraft route to include one or more empty flight legs. Continuing with the above example of the aircraft route ABCDA, it is possible that one or more of the flight leg AB, the flight leg BC, the flight leg CD, and the flight leg DA, is an empty flight leg.

In accordance with specific embodiments, the construction algorithm used at step 210 uses the demand information and the supply information to construct the schedule for the one or more specific days in the future that satisfies the flight demands of the customers and optimizes the schedule to achieve one or more specified objectives of the construction algorithm while complying with constraints related to the aircraft, the crew members, and the customers. Examples of the one or more specified objectives to be achieved by the construction algorithm (which can also be referred to as one or more specified objectives of the construction algorithm) include, but are not limited to, maximize revenues, minimize costs, maximize profits (e.g., where profits equal revenues minus costs), minimize flight legs that do not fly any of the customers (i.e., minimize empty flight legs), minimize how many of the crew members are used to satisfy flight demands, minimize how many aircraft are used to satisfy flight demands, maximize lifetime values (LTVs) of customers, minimize delays, and/or the like. Examples of constraints that may need to be complied with (i.e., satisfied) can include constraints related to aircraft, constraints related to crew members, and constraints related to customers. Such constraints may be stored in the data store 102, as noted above in the discussion of FIG. 1, and accessed by the construction algorithm. Constraints related to an aircraft can specify the type of pilot license required to fly the aircraft, the distance the aircraft can fly before needing to refuel, the distance the aircraft can fly before needing an inspection and/or other types of maintenance, the number of cabin crew members needed to operate the aircraft, and/or the like. Constraints related to crew members can, e.g., specify how many hours specific types of crew members are allowed to work without a break, how often specific types of crew members are required to be given breaks, how many hours specific types of crew members are allowed to work during a week or month, whether specific types of crew members are required to end their shift at their home base, and/or the like. Constraints related to customers can, e.g., specify how long customers can be delayed relative to their requested departure time, specific levels of service that are to be provided to specific customers, how long customers are allowed to remain in an aircraft on a tarmac, and/or the like. The result of running (aka executing) the construction algorithm is a schedule that satisfies (aka meets) the demands for the specific day in the future, which can be displayed to one or more users of the system and/or used to communicate notifications and/or other types information to entities involved in the schedule. The construction algorithm can also use other information, such as LTVs of customers, predicted flight times, and/or the like when constructing a schedule. Additional details how the construction algorithm can be used to construct a schedule for a specific day are described below in additional detail with reference to FIG. 3. In certain embodiments, the constraints related to the aircraft, the crew members, and the customers are all hard constraints. In alternative embodiments, at least one of the constraints is a soft constraint. A hard constraint, as the term is used herein, refers to a constraint that must be satisfied. A soft constraint, as the term is used herein, refers to a constraint for which it is preferred that the constraint is satisfied, and for which an effort is made to minimize deviation from the constraint if the constraint cannot be satisfied. Another way of explaining this is that a hard constraint is treated as a requirement, and a soft constraint is treated as a goal to be reached where an overall objective is to get as close to the soft constraint as possible. In accordance with certain embodiments, different soft constraints can be weighted differently, e.g., a first soft constraint can be weighted higher than a second soft constraint, such that if both the first and the second soft constraints cannot be satisfied, then a higher weight is given to minimizing the deviation from first constraint than to minimizing the deviation from the second constraint.

As can be appreciated from the above description, a schedule that is produced (aka generated) for an on-demand private aviation operator for a specific day or specific consecutive days in the future (aka a date or dates) needs to assign respective aircraft to respective aircraft routes, assign respective crew members to the respective aircraft routes or flight legs thereof, to satisfy the flight demands of the customers while satisfying numerous constraints related to aircraft, crew members, and customers, while also optimizing specified objectives. One possible algorithm for attempting to solve such a complex mathematical problem would be a brute-force optimization algorithm that attempts to determine every possible combination of aircraft, aircraft routes, crew members, and customer demands, while attempting to determine whether the numerous constraints related to aircraft, crew members, and customers are satisfied for these combinations, while also attempting to determine if the various specified objectives are achieved for these combinations, and then attempting to use the results thereof to identify an optimum solution. However, solving such a complex mathematical problem using such a brute-force algorithm is computationally intractable, i.e., NP hard. Indeed, even if the respective quantities of aircraft, crew members, and customer demands are relatively small (e.g., ten aircraft, twenty crew members, and twenty customer demands), solving such a complex mathematical problem using such a brute-force algorithm is still computationally intractable, i.e., NP hard. This is exacerbated by several orders of magnitudes if the quantities of aircraft, crew members, and customers are relatively large (e.g., two hundred aircraft, one thousand crew members, and four hundred customer demands). This could be even further exacerbated if one or more disruptions occur to aircraft and/or crew members on the specific day and/or just prior to the specific day.

Accordingly, it should be appreciated from the above discussion that an on-demand private aviation operator is presented with a technical problem related to how to construct and schedule for one or more specific days (e.g., two consecutive days) in the future (aka a date or dates), wherein the schedule needs to assign respective aircraft to respective aircraft routes, assign respective crew members to the respective aircraft routes or flight legs thereof, to satisfy the flight demands of the customers while satisfying numerous constraints related to aircraft, crew members, and customers, while also optimizing specified objectives. Many manners for attempting to solve the above described technical problem are computationally intractable, i.e., NP hard. Other manners for attempting to solve the above described technical problem may require massive amounts of computational resources and require many hours (e.g., 8 hours or more) to construct a schedule that meets (aka satisfies) all the aforementioned demands and constraints while also optimizing specified objectives. A further technical problem that is presented to an on-demand private aviation operator is how to recover from inevitable disruptions to a previously constructed schedule in near real-time operational decision making while still satisfying the flight demands of the customers, satisfying the numerous constraints related to aircraft, crew members, and customers, while also optimizing the specified objectives.

Beneficially, as will be described in additional detail below (initially with reference to FIG. 3), in accordance with certain embodiments of the present technology, a construction algorithm is implemented in a manner that enables a complex mathematical problem (that if attempted to be solved using a brute force optimization algorithm would be computationally intractable, i.e., NP hard, as explained above) to be solved in a computationally efficient manner, such that a schedule can be produced in less than ten minutes, and updated in less than one minute. More specifically, the construction algorithm according to embodiments of the present technology includes specific steps that are executed in a specific order to enable the construction algorithm to be executed relatively quickly, and in specific embodiments, in about ten minutes or less even when the quantities of aircraft, crew members, and customers are relatively large (e.g., two hundred aircraft, one thousand crew members, and four hundred customer demands). By contrast, alternative algorithms for producing such a schedule (that needs to assign respective aircraft to respective aircraft routes, assign respective crew members to the respective aircraft routes or flight legs thereof, to satisfy the flight demands of the customers while satisfying numerous constraints related to aircraft, crew members, and customers, while also optimizing specified objectives) by comparison may take eight hours or longer, or may not be able to produce a schedule at all if utilizing brute-force. Beneficially, as will also be described in additional detail below (initially with reference to FIG. 3), embodiments of the present technology also enable the on-demand private aviation operator to quickly and efficiently recover from inevitable disruptions to a constructed schedule in near real-time while still satisfying the flight demands of the customers, satisfying the numerous constraints related to aircraft, crew members, and customers, while also optimizing the specified objectives. Accordingly, as will be appreciated from the discussion of the embodiments of the present technology described below, such embodiments provide a technical solution to the above described technical problem that is presented to on-demand private aviation operator.

Still referring to FIG. 2, at step 212 there is a determination of whether the construction algorithm should be re-executed to update the constructed schedule or one or more portions thereof. The construction algorithm may be re-executed automatically in accordance with an algorithm execution schedule, e.g., once per day, or once every hour, but not limited thereto. Each time the construction algorithm is re-executed it may generate an entirely new schedule for the specific one or more days in the future (aka a specific date or dates). Alternatively, one or more portions of a previously determined schedule may be locked (at least for the time being) by an authorized user of the system, in which case when the construction algorithm is re-executed it may only generate entirely new portion(s) of the schedule for those portion(s) that have not been locked. Alternatively, or additionally, an authorized user of the system may at any time request that the construction algorithm be re-executed to generate an entirely new schedule or just one or more new portions thereof. For example, after a schedule has been constructed for two consecutive days in the future using the construction algorithm, an authorized user of the system may decide that they want to lock (i.e., fix) certain portions of the schedule (at least for the time being) and that they would like to change other portions of the schedule, e.g., because demand has changed (e.g., increased), supply has changed (e.g., decreased), and/or for any other reasons. Indeed, it is likely that the construction algorithm is re-executed at least once per day, and likely, is re-executed numerous times per day.

When the answer to the determination at step 212 is Yes, flow returns to steps 204 and 206 and the above described process is repeated, which results in a new schedule being generated at another instance of step 210. When the answer to the determination at step 212 is No, flow goes to step 214.

Step 214 involves determining whether the present day is one of the one or more specific days (for which the schedule has been determined), or whether the present day is within a specified temporal period (e.g., within 48 hours, 24 hours, or 6 hours) of the specific day(s). Assume for example that the schedule constructed at a most recent instance of step 210 was for the dates February 10th and 11th 2024, that the specified temporal period is 48 hours. Using this example, prior to 12:00 a.m. on Feb. 8, 2024, the answer to each instance of the determination of step 214 would be No. However, starting at 12:00 a.m. on Feb. 8, 2024, the answer to the determination at step 214 will be Yes. When the answer to the determination at step 214 is No, flow returns to step 212 as shown in FIG. 2. However, when the answer to the determination at step 212 is Yes, then flow goes to step 216, as shown in FIG. 2. More generally, at step 212 there is a determination of whether one or more updates to a previously constructed schedule for one or more specific days (that had been generated using the construction algorithm) should be produced using the construction algorithm, or should be produced using an improvement algorithm that differs from the construction algorithm. The determination, at step 212, of whether update(s) to a previously constructed schedule (for one or more specific days) should be produced using the construction or improvement algorithm can be automated, wherein the determination is made based on one or more predetermined criteria, e.g., such as how temporally close in time a present time/day is to the day(s) for which the schedule had been produced. Alternatively, the determination, at step 212, of whether update(s) to a previously constructed schedule (for one or more specific days) should be produced using the construction or improvement algorithm that can be manually selected by an authorized user of the system.

At step 216 the constructed schedule, which had been generated using the construction algorithm at one or more instances of step 210, may be considered to be substantially fixed for at least one of the one or more specified days in the future. This does not mean that changes (aka modifications) can no longer be made to the constructed schedule. Indeed, an authorized user of the system may be able to make manual changes to the constructed schedule if they so desire, and/or an improvement algorithm of an embodiment of the present technology can be used to make changes to the constructed schedule, as described in additional detail below. Rather, what this means is that from this time forward (i.e., once the answer to the determination at step 214 is Yes), the constructed schedule for the specific day will typically no longer be updated using the construction algorithm that had been used at instances of step 210, but rather will typically be updated using the improvement algorithm. Nevertheless, an authorized user of the system may at any time be given the option of using the construction algorithm or the improvement algorithm to update a previously constructed schedule. However, the benefits of using the construction algorithm to generate/update a schedule for a specific day(s) at some point become relatively small, in that savings or other improvements that can be achieved using the construction algorithm for those specific day(s) become quite limited.

Still referring to FIG. 2, step 218 involves communicating to relevant entities (e.g., crew members, customers, airport counter personnel, maintenance personnel, and/or the like) information about the aircraft routes and/or flight legs to which customers, crew members, aircraft, etc. have been assigned in accordance with the constructed schedule. Such entities may additionally and/or alternatively have been communicated with at earlier times, as may be the case if portions of the schedule had been locked (aka fixed) at one or more earlier times. Such communication performed at step 218 and/or at earlier times can be performed using an app, a website, via emails, via text messages, via phone calls, and/or the like. In accordance with certain embodiments, once crew members have been sent information about the aircraft routes and/or flight legs to which they have been assigned for a day in the future, any changes that are to be made to such assignments are made using the improvement algorithm rather than the construction algorithm. The method can also include flying at least a portion of the aircraft routes and/or flight legs thereof in accordance with the constructed schedule for the one or more specific days, which schedule was constructed using the construction algorithm.

At step 220 there is a determination of whether all aircraft routes included in the schedule for the specific day(s) have been completed. If the answer to the determination at step 220 is Yes, then the method is completed for the specific day(s). However, it should be appreciated that additional instances of the method summarized with reference to FIG. 2 can be in the process of being performed for other days, e.g., days that are 3 days, 4 days, 5 days, . . . 30 days, etc. in the future. In other words, numerous instances of the method summarized with reference to FIG. 2 can be performed in parallel, and/or serially, in order to construct schedules for multiple different days (or multiple different groups of consecutive days) in the future. If the answer to the determination at step 220 is No, i.e., if all aircraft routes included in the schedule for the specific day(s) have not yet been completed, then flow goes to step 222.

Step 222 involves determining whether an indication of a change, to at least one of the supply information or the demand information, has been received that warrants a modification to the schedule. Such an indication of a change to the supply information can be, for example, an indication of a disruption to at least one of the aircraft, crew members, or flight demands that causes at least a portion of the schedule to become infeasible, unnecessary, or improvable. Examples of such disruptions to aircraft include one or more aircraft having been grounded for any number of reasons (e.g., engine malfunction, fuel leak, landing gear malfunction, just to name few), one or more aircraft not being able to fly certain aircraft routes or flight legs thereof to which the aircraft had been assigned (e.g., due to weather related delays, and/or any other unscheduled delays). Examples of disruptions to crew members include one or more crew members being unable to fly aircraft routes or flight legs thereof to which the crew members were assigned (e.g., due to sickness, unscheduled delays and/or any other reasons). Examples of disruptions, or more generally changes, to one or more flight demands, which may result in an aircraft route or one or more flight legs thereof becoming unnecessary, include a customer canceling their flight demand, or a customer changing the departure date of their flight demand to a few days later, but are not limited thereto. Examples of disruptions, or more generally changes, to one or more flight demands, which may result in an aircraft route or one or more flight legs thereof becoming infeasible, include a customer changing their flight demand by increasing the number of passengers that will be traveling with the customer, which can necessitate that a larger capacity aircraft be used (in place of a previously assigned aircraft) to satisfy the changed customer demand. More generally, examples of changes to the demand information include a customer canceling their flight demand, a customer changing their flight demand, and a customer submitting a new flight demand. More generally, examples of changes to the supply information include a crew member becoming unavailable, a previously unavailable crew member becoming available, an aircraft becoming unavailable, or a previously unavailable aircraft becoming available. For a more specific example, of a change to the supply (that may warrant a change to the schedule) is an aircraft returning early from maintenance and hence becoming available sooner than anticipated, in which case the on-demand private aviation operator take advantage of the increase in the supply of aircraft to improve an existing schedule. Similarly, if a crew member returns back from time-off early or a new crew member is hired, the increase in the supply of crew member could potentially be used to improve an existing schedule. A further example of a change to supply is a change to a condition and/or regulation at an airport that makes it possible to land an aircraft at the airport, where that was not an option at the time the schedule was constructed, which may allow for the schedule being improved. These are just a few examples of the types of changes to the supply information and/or demand information that may warrant a modification to the schedule constructed using the construction algorithm. If the answer to the determination at step 222 is No, then flow returns to step 220. If the answer to the determination at step 224 is Yes, then flow goes to step 224.

Step 224 involves using an improvement algorithm to modify one or more portion of the schedule to achieve one or more objectives of the improvement algorithm (which can be the same or different than the objectives that are to be achieved using the construction algorithm at instances of step 201) while complying with the constraints related to the aircraft, the crew members, and the customers, wherein the improvement algorithm differs from the construction algorithm that is used at instances of step 210. More specifically, at step 224, the schedule that had been constructed using the construction algorithm is modified, as necessary, to account for disruptions, such as one or more aircraft being grounded and/or one or more crew members becoming sick, and/or one or more flight demands being canceled or otherwise changed, and/or the like. In accordance with certain embodiments of the present technology, the improvement algorithm can modify a portion of the schedule for the specific day(s) by identifying a replacement aircraft to replace one of the aircraft that has been grounded or delayed, identifying a replacement crew member to replace one of the crew members that has become unavailable, assigning an aircraft that had previously been unavailable to an aircraft route, assigning a crew member that had previously been unavailable to an aircraft route or one or more flight legs thereof, swapping assignments for at least some of the crew members, swapping assignments for at least some of the aircraft, identifying a replacement aircraft route to replace one of the aircraft routes that became infeasible. It is also possible that the improvement algorithm can modify a portion of the schedule by assigning one or more of the flight demands for one or more of the customers to one or more third-party aircraft, which may occur if the on-demand private aviation operation is unable to support one or more flight demands because of one or more disruptions. The improvement algorithm may also cancel one or more aircraft routes, or one or more flight legs thereof, in response to a customer canceling their flight demand, in which case the improvement algorithm may also cancel or change crew member assignments. Example objectives that the improvement algorithm may be used to achieve (and that the construction algorithm may not be used to achieve) can relate to minimizing changes to the schedule that had already been constructed. For a more specific example, an objective that the improvement algorithm can be used to achieve can be to minimize how many and/or to what extent changes are made to crew member assignments, to aircraft routes and/or flight legs thereof that have already been communicated to crew members. For another specific example, an objective that the improvement algorithm can be used to achieve can be to minimize how many and/or to what extent changes are made to flight legs used to satisfy customer flight demands for which information about the flight legs have already been communicated to the customers. One or more of the objectives of the improvement algorithm can be the same or similar to one or more objectives of the construction algorithm for which example objectives were already described above. Purposes of construction and improvement algorithms and their use cases are different. As can be appreciated from the above discussion, the construction algorithm is used to construct an overall schedule for one or more specific days (e.g., two consecutive days) in the future considering all of demand information and supply information for the specific day(s) in the future. By contrast, the improvement algorithm addresses one or more changes to supply and/or demand that affect relatively small portion(s) of the overall schedule (that had been constructed using the construction algorithm, and may or may not have already been modified using the improvement algorithm). Further details of the improvement algorithm are described below initially with reference to FIG. 4.

It is noted that if one or more of the aforementioned disruptions occurred earlier in time, before the constructed schedule for a present day and its following day was substantially fixed at step 216, and more generally, before the answer to the determination at step 214 was Yes, then the construction algorithm used at instances of step 210 could have been re-executed and used to revise the schedule, or at least a portion thereof, to account for the disruption(s). However, after the schedule had been substantially fixed for one or more specified day(s) at step 216 and crew members and customers have been informed of the aircraft routes or flight legs thereof to which they have been assigned, and more generally, after the answer to the determination at step 214 is Yes, it may be beneficial to revise the schedule using an improvement algorithm, rather than the construction algorithm, in order to minimize changes made to an already constructed schedule. This can be because aircraft and crew members may already be (or about to be) in the process of flying the aircraft routes to which they were assigned, and/or because customers may already be on their way to airports to start their journey with assigned aircraft, or may already be in the process of being flown on their assigned aircraft, and/or the like. In other words, there is a point in time at which using the construction algorithm to modify a previously determined schedule becomes too disruptive, inappropriate and/or otherwise suboptimal. In accordance with certain embodiments, one of the objectives to be achieved by the improvement algorithm can be minimizing the changes to the schedule, which can include minimizing the changes to aircraft routes and/or flight legs thereof to which crew members have already been assigned and notified (e.g., via communications) of their assignments.

Still referring to FIG. 2, step 226 involves communicating to relevant entities (e.g., pilots, crew members, customers, airport counter personnel, maintenance personnel, and/or the like) indications of changes resulting from the improvement algorithm being used modify one or more portions of the substantially fixed schedule. Such communication performed at step 226 can be performed via the app, the website, emails, text messages, phone calls, and/or the like. Flow then returns to step 220 as shown in FIG. 2. So long as the answer to the determination at step 220 is No, flow will continue to follow the loop from step 222 back to step 220, or from step 222, to step 224, to step 226, back to step 220. In this manner, whenever an indication of a new disruption is received at an instance of step 222, the improvement algorithm will be used at an instance of step 224 to modify one or more portions of the substantially fixed schedule to account for the new disruption. The method can also include flying at least a portion of the aircraft routes and/or flight legs thereof in accordance with the schedule as modified using the improvement algorithm to account for the disruptions.

Figure 3:
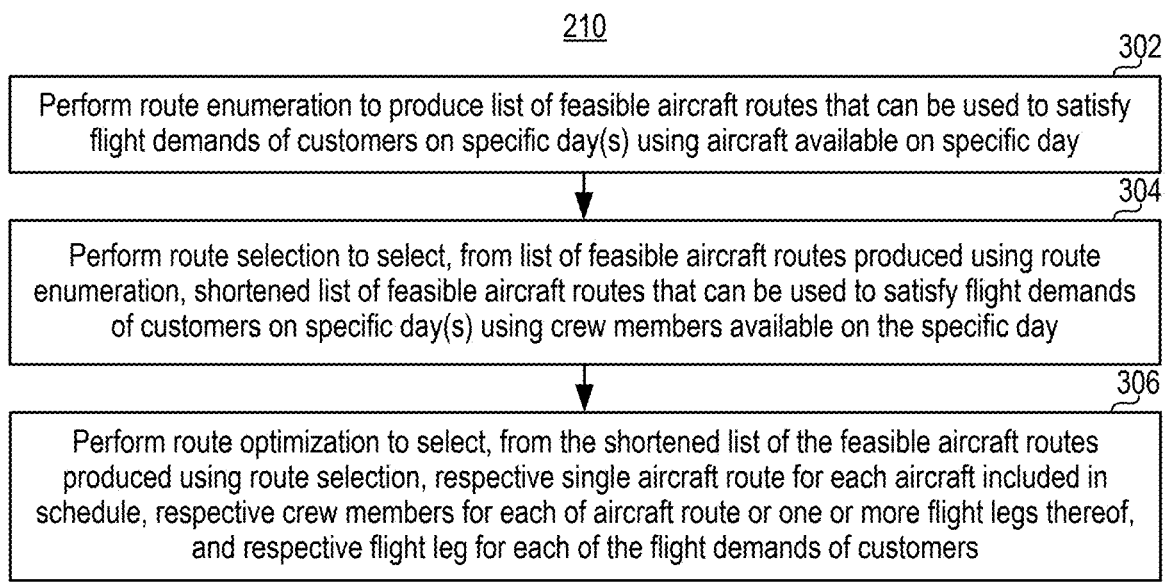
FIG. 3 is a high level flow diagram used to provide additional details of a route enumeration step introduced in FIG. 2, according to certain embodiments of the present technology.

The high level flow diagram in FIG. 3 will now be used to provide additional details of step 210 introduced in FIG. 2, and more specifically, will be used to describe how the construction algorithm is used to construct the schedule for the specific day in the future in accordance with certain embodiments of the present technology.

Referring to FIG. 3, step 302 involves performing route enumeration to produce a list of feasible aircraft routes that can be used to satisfy the flight demands of the plurality of customers on the specific day using those of the plurality of aircraft available on the specific day. In an embodiment, the route enumeration performed at step 302 involves enumerating all feasible aircraft routes given a list of flight demands, such that flight demands included in the given list are all satisfied. The route enumeration performed at step 302 can additionally include checking for necessary crew member swaps required to cover the feasible aircraft routes, and identifying all possible locations for crew member swaps. The list of feasible aircraft routes that is produced as a result of performing step 302 can be referred to more specifically as an enumerated list of feasible aircraft routes.

Step 304 involves performing route selection to select, from the list of feasible aircraft routes (aka the enumerated list of feasible aircraft routes) produced at step 302 as a result of performing the route enumeration, a shortened list of the feasible aircraft routes that can be used to satisfy the flight demands of the plurality of customers on the specific day using those of the plurality of crew members available on the specific day. In an embodiment, the shortened list is based on one or more specified considerations, such as providing sufficient coverage for all of the flight demands. Additional and/or alternative considerations that can be used to perform the route selection at step 304, to produce the shortened list, include the friendliness of crew member swaps, and trading-off diversity of aircraft routes with quality of aircraft routes. Some crew member swaps may be considered more friendly than others, e.g., where crew members are able to perform a swap at or close to their home base compared to far from their home base In accordance with certain embodiments, the route selection performed at step 304 includes, for each aircraft route, identifying necessary flight leg indices for crew swaps involving the PIC and SIC crew members. Additionally, based on crew swap requirements and feasibility, each of the aircraft routes can be categorized into four types, including: no crew swap required, unaffected no swap, partial crew swap, and complete crew swap. Crew member lists can then be compiled based on specified criteria to facilitate efficient crew swaps and improve scheduling. Feasible routes with crew swap options can then be stored in a dictionary categorized by aircraft and crew type. The route selection performed at step 304 can discard routes of poor quality with respect to key performance indicators (KPIs). Beneficially, this helps to reduce an amount of time needed to perform route optimization (at step 306, discussed below).

Step 306 involves performing route optimization to select, from the shortened list of the feasible aircraft routes, a respective single aircraft route for each of the aircraft included in the schedule, respective crew members for each of the respective flight legs used to satisfy the flight demands of the customers. In accordance with certain embodiments, the route optimization performed at step 306 optimizes the schedule to achieve one or more specified objectives while complying with the constraints related to the aircraft, the crew members, and the customers.

Examples of objectives to achieve, when performing the route optimization of the construction algorithm at step 306, include: maximize revenues, minimize costs, maximize profits (e.g., where profits equal revenues minus costs), minimize flight legs that do not fly any of the customers (i.e., minimize empty flight legs), minimize how many of the crew members are used to satisfy flight demands, minimize how many aircraft are used to satisfy flight demands, maximize customer lifetime value, minimize delays, and/or the like. Examples of constraints that may need to be complied with (i.e., satisfied), when performing the route optimization at step 302, include: constraints related to aircraft, constraints related to crew members, and constraints related to customers. Constraints related to an aircraft can specify the type of pilot license required to fly the aircraft, the distance the aircraft can fly before needing to refuel, the distance the aircraft can fly before needing an inspection and/or other types of maintenance, the number of cabin crew members needed to operate the aircraft, and/or the like, as was noted above. Constraints related to crew members can, e.g., specify how many hours specific types of crew members are allowed to work without a break, how often specific types of crew members are required to be given breaks, how many hours specific types of crew members are allowed to work during a week or month, whether specific types of crew members are required to end their shift at their home base, and/or the like, as was noted above. Constraints related to customers can, e.g., specify how long customers can be delayed relative to their requested departure, specific levels of service that are to be provided to specific customers, how long customers are allowed to remain in an aircraft on a tarmac, and/or the like, as was noted above.

In certain embodiments, the route optimization is performed at step 306 using mixed-integer programming (MIP) which involves problems in which only some of the variables are constrained to be integers, while other variables are allowed to be non-integers. A benefit of using MIP to perform the route optimization is that preprocessing can be used to simplify ensuing branch-and-bound calculations, wherein the preprocessing involves quickly pre-examining and eliminating some of the possible futile subproblem candidates that branch-and-bound calculations would otherwise analyze. In accordance with certain embodiments, an MIP solver, such as the Gurobi Optimizer developed by Gurobi Optimization, LLC (headquartered in Beaverton, Oregan, USA) can be used to perform the route optimization at step 306. However, it is also possible to utilize other commercially available or custom problem solvers to perform the route optimization at step 306.

In accordance with certain embodiments, performing the route optimization at step 306 can include building a mixed integer program to be solved by an MIP solver, wherein objectives are to maximize or minimize certain functions while ensuring that all given constraints and other conditions are met. Binary variables for aircraft route assignments and crew swaps can be stored. Some constraints can be used to ensure that each aircraft and flight demand is assigned once, and to regulate crew assignments and swaps. Some objectives can relate to maximizing profits earned, minimizing delay costs, minimizing aircraft usage, and minimizing crew cost, as well as facilitating decision-making for aircraft routing and crew scheduling optimization. An output of step 306 can include selected aircraft routes and crew swaps. The route optimization performed at step 306 can also involve performing validation tests on the selected routes and crew swaps based on input parameters, to ensure that constraints are met. Further, as part of the route optimization performed at step 306, various data transfer objects (DTOs) may be computed that correspond to crew assignments, maintenance details, managed and unmanaged flight legs, proposed empty flight legs, and/or the like, and such DTOs can be written into a database (e.g., of the data store 102). A grouping engine can be used to group certain DTOs to form structured data based on specified criteria, which can be persisted in a database for further analysis. A metric engine can compute key performance indicators (KPIs) and metrics from the DTOs, thereby facilitating insights into aircraft utilization, crew assignments, and network efficiency, metrics for which can also be stored in the database for analysis.

Assume, for example, that the supply (aka assets) available for a specified day in the future includes 200 aircraft, and 500 pilots. Also assume that the demand for the specified day includes 2000 flight demands (aka flight itineraries)

requiring flights departing from and/or arriving at 50 different airports. Assuming these example numbers, the results of the flight enumeration performed at step 302 may, for example, be on the order of about 200,000 feasible aircraft routes, where, for each aircraft of the 200 aircraft available on the specified day about 1,000 feasible aircraft routes may be identified and included in the enumerated list of feasible aircraft routes to satisfy the flight demands of customers. The performing of the route selection at step 304 to select a shortened list (from the enumerated list of feasible aircraft routes produced at step 302), can result in a shortened list of the feasible aircraft routes including, for example, about 800 feasible aircraft routes for each of the 200 aircraft (down from about 1000 feasible aircraft routes that had been included in the enumerated list of feasible aircraft routes), in which case the shortened list may include about 160,000 feasible aircraft routes. Finally, the route optimization performed at step 306 will narrow down the shortened list to no more than a single aircraft route for each of the 200 aircraft available on the specified day, and if less than all of the 200 aircraft are needed to satisfy the demands, may result in some of the 200 aircraft not having any aircraft route assigned to them on the specified day. Similarly, if an objective is to minimize the number of crew members used to satisfy the demands, there will likely be at least some pilots that do not have an assignment on the specified day.

Figure 4:
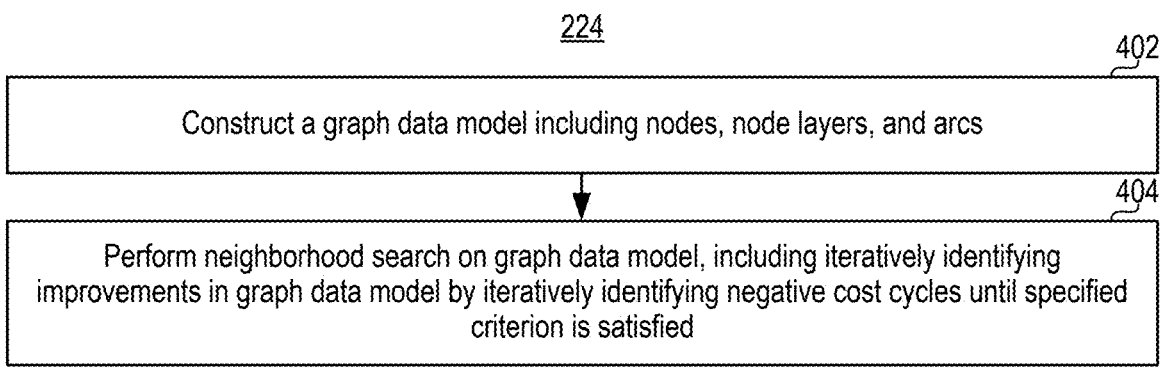
FIG. 4 is a high level flow diagram used to provide additional details of an improvement algorithm used in one of the steps introduced in FIG. 2, according to certain embodiments of the present technology.

The high level flow diagram in FIG. 4 will now be used to provide additional details of step 224 introduced in FIG. 2, and more specifically, will be used to describe how the improvement algorithm is used to repair or otherwise improve a previously constructed schedule in accordance with certain embodiments of the present technology. The improvement algorithm, which can also be referred to as an improvement optimizer, allows performing of close to real-time incremental schedule optimization that addresses common and disruptive problems in flight operations, as well as other types of changes to supply and/or demand. For example, when a disruption arises which interrupts the ability for the aircraft or crew member(s) to complete an aircraft route to which they have been assigned, or one or more flight legs thereof, the improvement algorithm is used to recover from such disruptions. When a disruption occurs that makes one or more flight legs on one or more aircraft infeasible, one or more flight demands that had been assigned to the infeasible aircraft are said to go into recovery, which means that the improvement algorithm is used to modify the schedule to satisfy the flight demand(s) that could no longer be satisfied using the schedule that had been produced prior to the disruption. More generally, when a change to supply and/or demand occurs that warrants a modification to the schedule, the improvement algorithm is used to modify one or more portions of the schedule.

Referring to FIG. 4, step 402 involves constructing a graph data model including nodes, node layers, and arcs, wherein each of the nodes corresponds to a respective flight demand, wherein each of the node layers corresponds to a respective aircraft route that can be used to satisfy one or more of the flight demands, and wherein the arcs define links between pairs of the nodes in different ones of the node layers. An example of such a graph date model, and nodes, node layers, and arcs thereof, are described below with reference to FIG. 8A. Still referring to FIG. 4, step 404 involves performing a neighborhood search on the graph data model (constructed at step 402), which includes iteratively identifying improvements in the graph data model by iteratively identifying Negative Cost Cycles (NCCs) until a specified criterion is satisfied.

Figure 5:
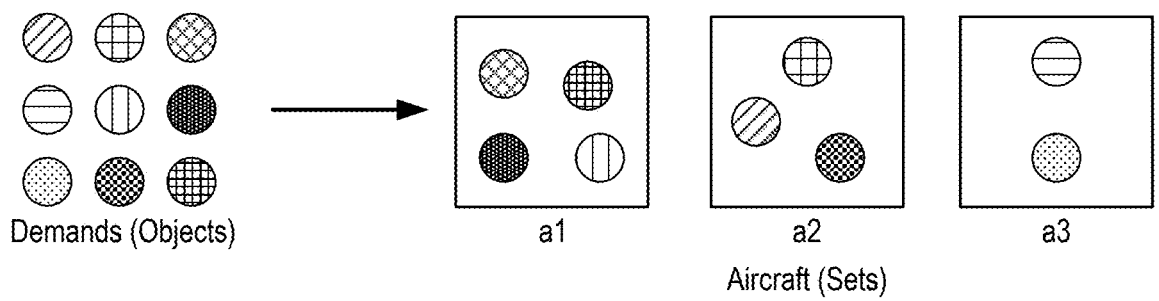
FIG. 5 pictorially illustrates how the improvement algorithm of an embodiment can be treated as a set partitioning problem.

In accordance with certain embodiments, the improvement algorithm solves an improvement optimization problem, where a set of customer flight requests (denoted by Demands) are to be assigned to a set of aircraft (denoted by Aircraft) such that the total operating cost is minimized and/or one or more other objectives is/are optimized. In an embodiment, this is treated as a set partitioning problem, which can be described with reference to FIG. 5. Referring to FIG. 5, flight demands of customers (which can be considered objects) are represented on the left by differently shaded circles, and aircraft (which can be considered sets) are represented on the right by rectangles labeled a1, a2, and a3. In the set partitioning problem, M objects are to be assigned to N different sets such that each object is assigned to only one set, whereby a total assignment cost is to be minimized and/or one or more other objectives are optimized, and/or one or more other constraints are satisfied.

Figure 6:
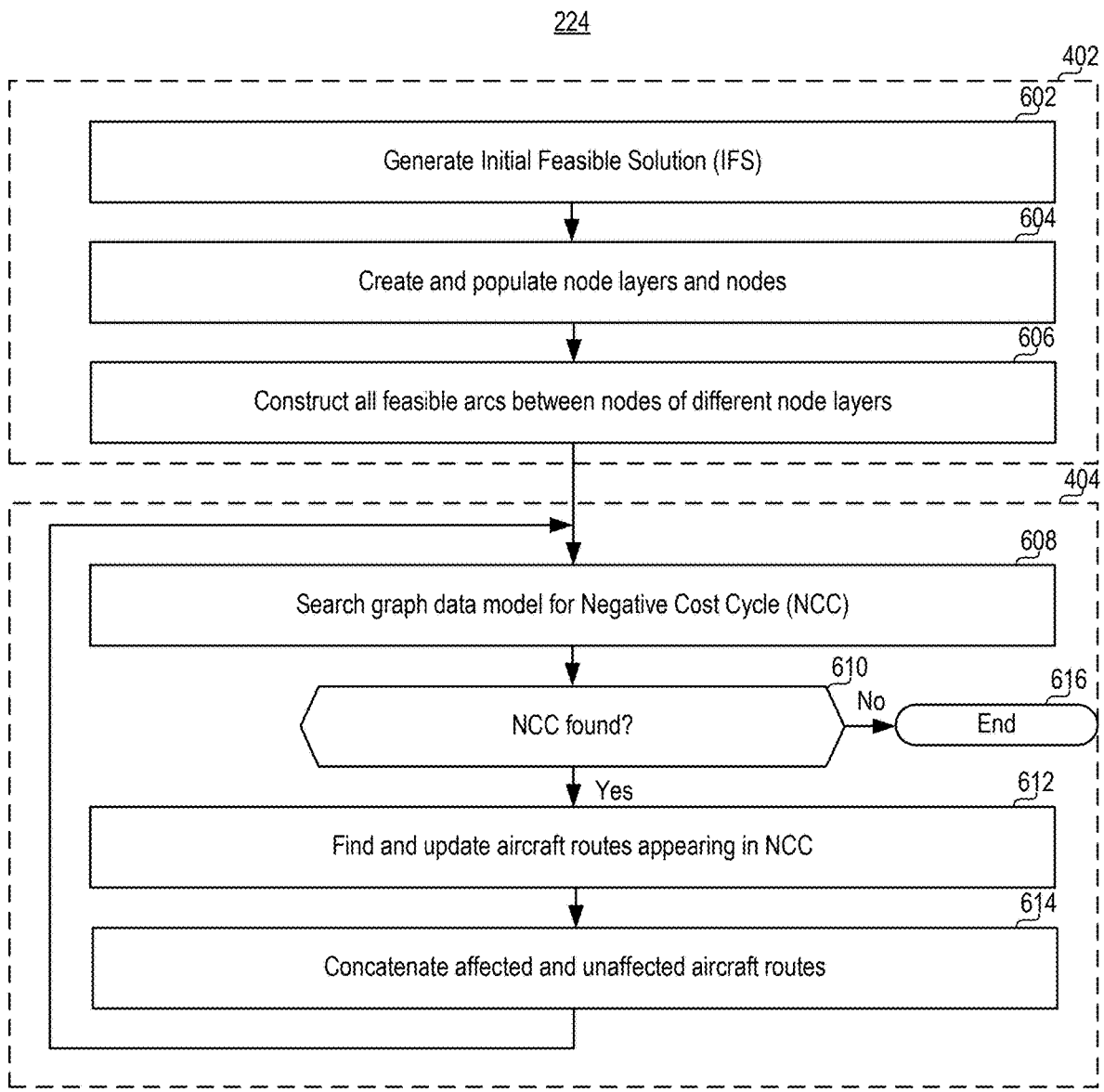
FIG. 6 is a high level flow diagram used to provide further details of the improvement algorithm used in one of the steps introduced in FIG. 2, and for which additional details are also introduced in FIG. 4.

FIG. 6 is now used to describe further details of the improvement algorithm used at step 224 in FIG. 2, and for which additional deals are also described above with reference to FIG. 4. Referring to FIG. 6, step 602 involves generating an Initial Feasible Solution (IFS). Additional details of step 602 are described below with reference to FIGS. 7A and 7B. Still referring to FIG. 6, step 604 involves creating and populating node layers and nodes, wherein nodes layers correspond to aircraft routes, and nodes correspond to flight demands. Step 606 involves constructing all feasible arcs between nodes of different node layers. Additional details of steps 604 and 606 are described below with reference to FIGS. 8A-8C. Steps 602, 604, and 606 in FIG. 6 are examples of steps (aka sub-steps) that can be performed to construct the graph data model at step 402 in FIG. 4, in accordance with an embodiment.

Still referring to FIG. 6, step 608 involves searching the constructed graph data model for a Negative Cost Cycle (NCC). At step 610 there is a determination of whether an NCC has been found. If the answer to the determination at step 610 is Yes, then flow goes to step 612 at which each aircraft route appearing in the NCC that is found (at step 608) is updated, and then at step 614 affected and unaffected aircraft routes are concatenated. More specifically, at step 612, affected aircraft routes can be segregated from unaffected aircraft routes based on the NCC found, and flight demands and resource allocations can be updated for affected aircraft routes. At step 614 updated aircraft routes and unaffected aircraft routes can be combined to create a complete solution composed of feasible routes. Flow then returns to step 608 at which another NCC is searched for, and then to step 610 at which there is another determination of whether an NCC was found at the most recent instance of step 608.

The above described process is repeated until the answer to the determination at an instance of step 610 is No, i.e., until no further NCC is found, and the iterative process then ends as indicated at step 616. Steps 608, 610, 612, 614, and 616 in FIG. 6 are examples of steps (aka sub-steps) that can be performed to implement the iterative neighborhood search at step 404 in FIG. 4, in accordance with an embodiment. In an embodiment, the determination at step 610 (or another step) can alternatively (or additionally) be whether a specified number of iterations (e.g., 1000) of the neighborhood search have already occurred, whether a specified time limit (e.g. 5 minutes) for performing the iterative neighborhood search have already occurred, or whether the iterative improvement provided by the most recently found NCC is below some specified threshold. In other words, it is possible that the iterative neighborhood search is ended based on some other criterion being satisfied besides the criterion that no further NCC is found. More generally, at step 610 there can be a determination of whether or not a specified criterion has been satisfied such that the neighborhood search being performed on the graph data model should be ended, whereby if the specified criterion is satisfied (e.g., if there are no more NCCs found, but not limited thereto) the search is ended.

Figure 7A:
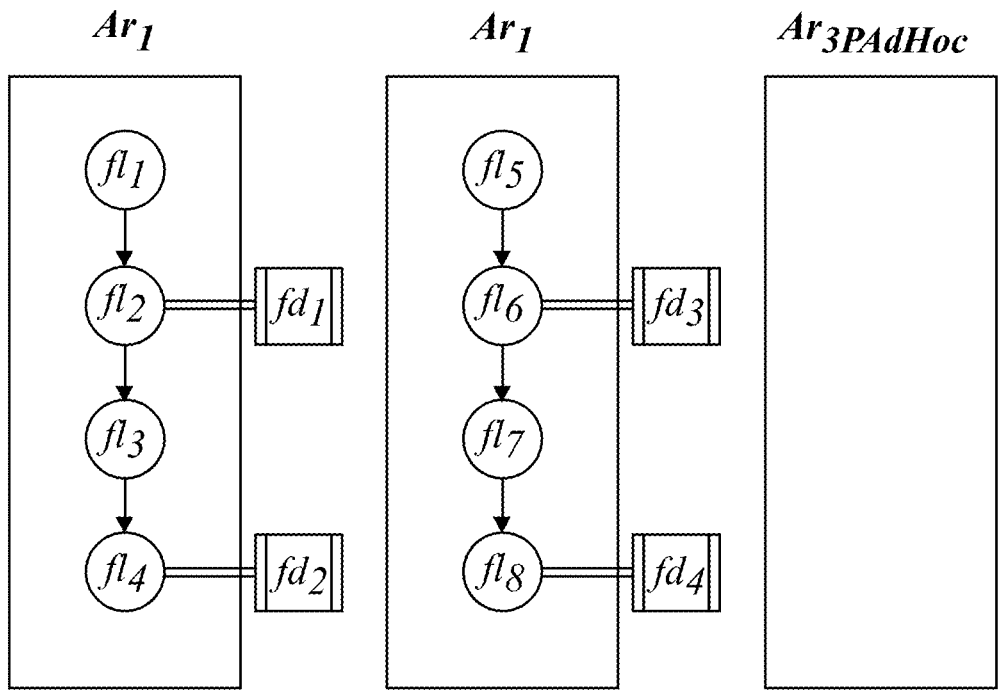
FIG. 7A pictorially illustrates a simple example of a schedule constructed in accordance with an embodiment of the present technology.
Figure 7B:
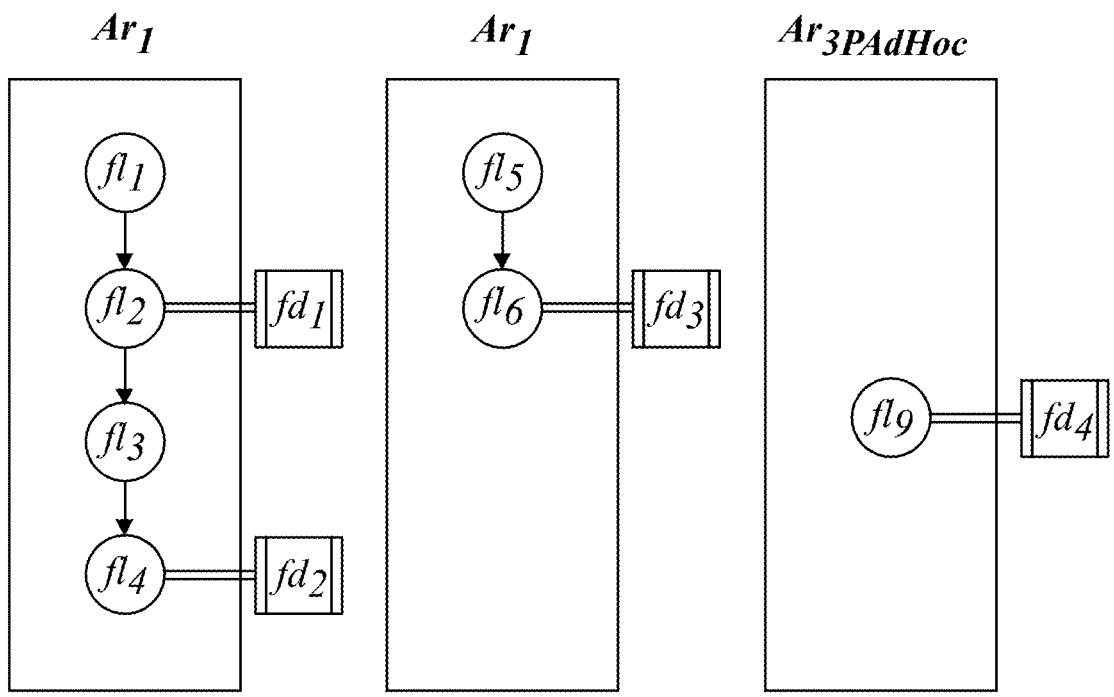
FIG. 7B pictorially illustrates an example Initial Feasible Solution (IFS) that can be generated as part of recovering from a disruption to the schedule pictorially illustrated in FIG. 7A, in accordance with an embodiment of the present technology.

FIG. 7A is now used to pictorially illustrate a simple example of a schedule constructed at step 210 (in FIG. 2) using the construction algorithm, and FIG. 7B is used to pictorially illustrate how an Initial Feasible Solution (IFS) can be generated at step 602 (in FIG. 6), as part of the improvement algorithm used at step 224 (in FIG. 2). Referring to FIG. 7A, the left most large rectangle labeled Ar1 corresponds to a first aircraft route of the on-demand aviation operator, the middle large rectangle labeled Ar2 corresponds to a second aircraft route of the on-demand aviation operator, and the right most large rectangle labeled Ar3PAdHoc corresponds to third aircraft route which is provided by a third party (3P) aviation operator, e.g., from which the on-demand aviation operator can purchase excess capacity (aka supply) on the spot market or under some other arrangement. The circles labeled fl1, fl2, fl3, and fl4 correspond four flight legs (fls) of the first aircraft route Ar1, and the circles labeled fl5, fl6, fl7, and fl8 correspond four flight legs (fls) of the second aircraft route Ar2. The small rectangles labeled fd1, fd2, fd3, and fd4 correspond to four flight demands, with the flight demand fd1 shown as being assigned to fl2 of Ar1, the flight demand fd2 shown as being assigned to fl4 of Ar1, the flight demand fd3 shown as being assigned to fl6 of Ar2, and the flight demand fd4 being assigned to the fl8 of Ar2. In other words, flight legs fl2, fl4, fl6 and fl8 are loaded and cater to flight demands fd1, fd2, fd3 and fd4 respectively. By contrast, flight legs fl1, fl3, fl5 and fl7 are empty (i.e., are not carrying any customers).

Another way to explain FIG. 7A is that schedule constructed at step 210 (in FIG. 2) using the construction algorithm resulted in two aircraft routes Ar1 and Ar2 consisting of four flight legs each:

Ar1: fl1 (Empty)→fl2 (Loaded)→fl3 (Empty)→fl4 (Loaded); and

Ar2: fl5 (Empty)→fl6 (Loaded)→fl7 (Empty)→fl8 (Loaded).

Also assume that each aircraft route caters to two flight demands:

In Ar1—fl2: fd1, fl4: fd2; and

In Ar2—fl6: fd3, fl8: fd4.

Now assume that flight demand fd4 goes into recovery because the flight leg fl8 to which fd4 was assigned is no longer feasible, e.g., due to a malfunction of Ar2 or to one of the crew members assigned to the flight leg fl8 becoming sick or otherwise unavailable. In other words, assume that at step 222 (in FIG. 2) an indication is received that there is a change (e.g., disruption) that causes flight demand fd4 to go into recovery, which will result in the improvement algorithm being used at step 224 (in FIG. 2). Continuing with this example, in an embodiment, the IFS generated at step 602 can assign the fd4 (which is in recovery) to a flight leg fl9 supported by the Ar3PAdHoc, as depicted in FIG. 7B. In other words, the IFS generated at step 602 can be as follows:

Ar1: fl1 (Empty)→fl2: fd1→fl3 (Empty)→fl4: fd2;

Ar2: fl5 (Empty)→fl6: fd3; and

Ar3: fl9: fd4.

More specifically, flight legs fl7 and fl8 are removed from Ar2, and flight leg fl9 is added to Ar3PAdHoc.

Figure 8A:
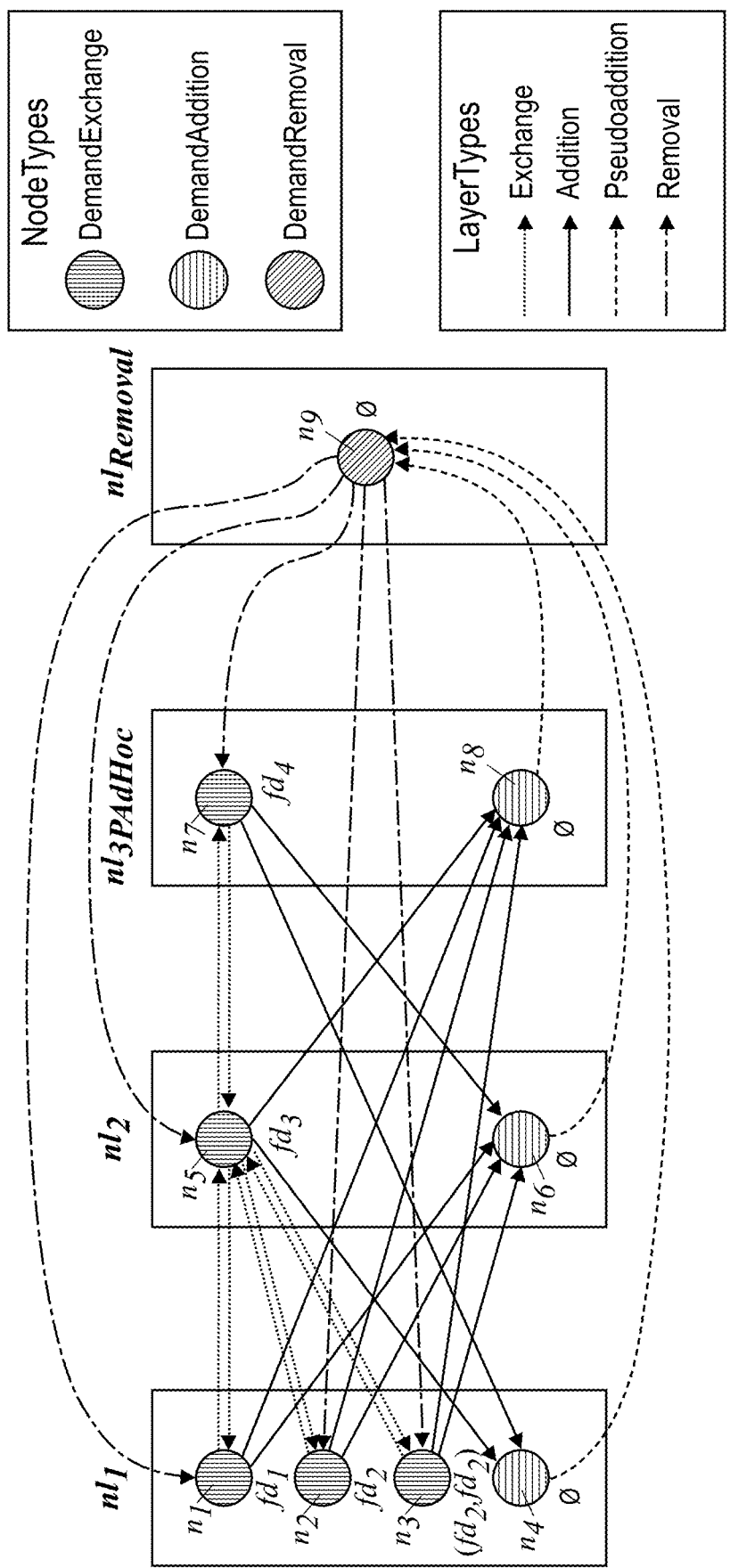
FIG. 8A pictorially illustrates node layers and nodes of an example graph data model that is constructed and used to recover from a disruption to a previously constructed schedule, in accordance with an embodiment of the present technology.

FIG. 8A is now used to pictorially illustrated how node layers and nodes can be created at step 604 (in FIG. 6), after the IFS was generated at step 602. Continuing with this example, the following four node layers and nodes are created at this step:

AircraftNodeLayer nl1 corresponding to Ar1 with the following nodes:
DemandExchange nodes correspond to a sequence of actual flight demands:
n1: fd1
n2: fd2
n3: (fd1, fd2)
DemandAddition node does not correspond to any flight demand:
n4: Ø

AircraftNodeLayer nl2 corresponding to Ar2 with the following nodes:
DemandExchange node corresponds to a sequence of actual flight demands:
n5: fd3
DemandAddition node does not correspond to any flight demand:
n6: Ø.

A single 3PAdhocNodeLayer nl3PAdHoc corresponding to 3PAdHoc aircraft with the following nodes:
DemandExchange node corresponds to a sequence of actual flight demands:
n7: fd4
DemandAddition node does not correspond to any flight demand:
n8: Ø1.
DemandRemoval Node does not correspond to any flight demand:
n9: Ø

In FIG. 8A, node layers nl1 and nl2 correspond to aircraft routes Ar1 and Ar2. node layer nl3PAdHoc corresponds to 3PAdHoc AircraftRoute generated by the IFS Generator. Node layer nlRemoval is an auxiliary node layer that does not correspond to any aircraft route. Only a demand exchange node corresponds to a sequence of flight demands. All possible arcs are drawn between the various Nodes in different node layers. Due to the paucity of space in FIG. 8A, Exchange arcs of n7 with nodes in nl1 are not depicted in the figure but are highlighted in the following text.

It is assumed that all arcs are feasible. There are four kinds of arcs that are created, including Exchange arcs, Addition arcs, PseudoAddition arcs, and Removal arcs. The arcs that are drawn between the various Nodes are described below.

Exchange arc adds a node from its tail node layer to its head node layer and removes the node at its head:
From nl1 to nl2: n1→n5, n2→n5, n3→n5
From nl2 to nl1: n5→n1, n5→n2, n5→n3
From nl1 to nl3PAdHoc: n1→n7, n2→n7, n3→n7
From nl2 to nl3PAdHoc: n5→n7
From nl3PAdHoc to nl1: n7→n1, n7→n2, n7→n3
From nl3PAdHoc to nl2: n7→n5.

Addition arc adds a node from its tail node layer to its head node layer without removing the node at its head:
From nl1 to nl2: n1→n6, n2→n6, n3→n6
From nl2 to nl1: n5→n4
From nl1 to nl3PAdHoc: n1→n8, n2→n8, n3→n8
From nl2 to nl3PAdHoc: n5→n8
From nl3PAdHoc to nl1: n7→n4
From nl3PAdHoc to nl2: n7→n6

PseudoAddition arc does not add any node to its head node layer and does not remove any node from its head node layer. It facilitates the completion of a cycle in the improvement graph by connecting the DemandAddition node to the DemandRemoval node:
From nl1 to nlRemoval: n4→n9
From nl2 to nlRemoval: n4→n9
From nl3PAdhoc to nlRemoval: n8→n9.

Removal arc does not add any Node to its head NodeLayer but removes the node from its head NodeLayer:
From nlRemoval to nl1: n9→n1, n9→n2, n9→n3
From nlRemoval to nl2: n9→n5
From nlRemoval to nl3PAdhoc: n9→n7

Figure 8B:
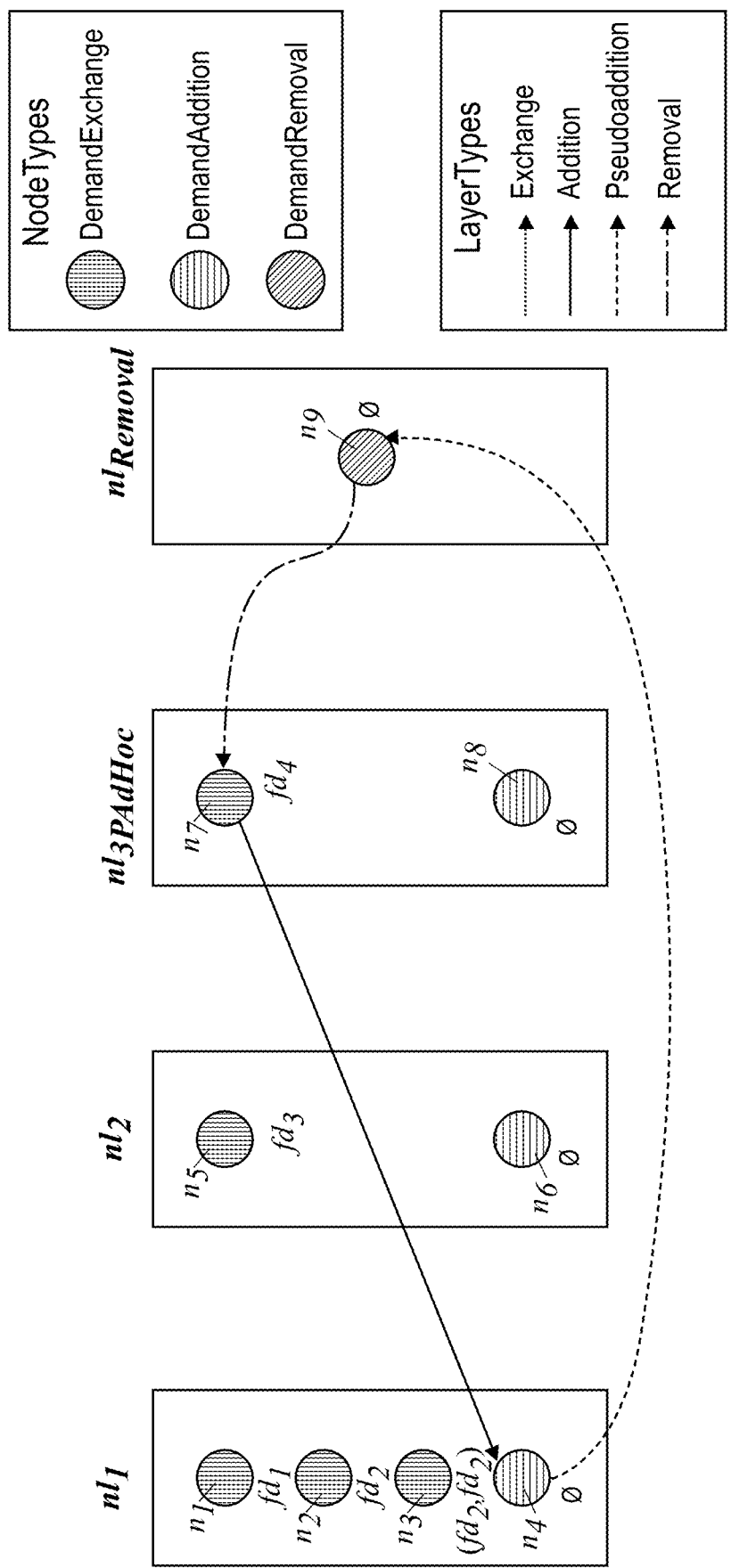
FIGS. 8B and 8C pictorially illustrates examples of negative cost cycles (NCCs) found by searching the graph data model pictorially illustrated in FIG. 8A as part of an improvement algorithm, in accordance with an embodiment of the present technology.

After all feasible arcs between nodes of different node layers are drawn (aka constructed) at step 606 (in FIG. 6), there is a search for a NCC at step 608 (in FIG. 6). Two examples of possible negative cost cycles (NCCs) are described with reference to FIGS. 8B and 8C. NCC 1 is described with reference to FIG. 8B. Referring to FIG. 8B, the various Arcs in the cycle represent:

1. Addition arc from nl3PAdHoc to nl1: Addition of Node n7 to NodeLayer nl1
2. PseudoAddition arc nl1 to nlRemoval: No addition or removal of Nodes
3. Removal arc from nlRemoval to nl3PAdhoc: No addition but the removal of Node n7 from NodeLayer nl3PAdHoc.

The resulting solution for the improvement problem is as follows:
Ar1 serves fd1, fd2, fd4
Ar1 serves fd3
Ar3PAdHoc does not serve any flight demand.

Figure 8C:
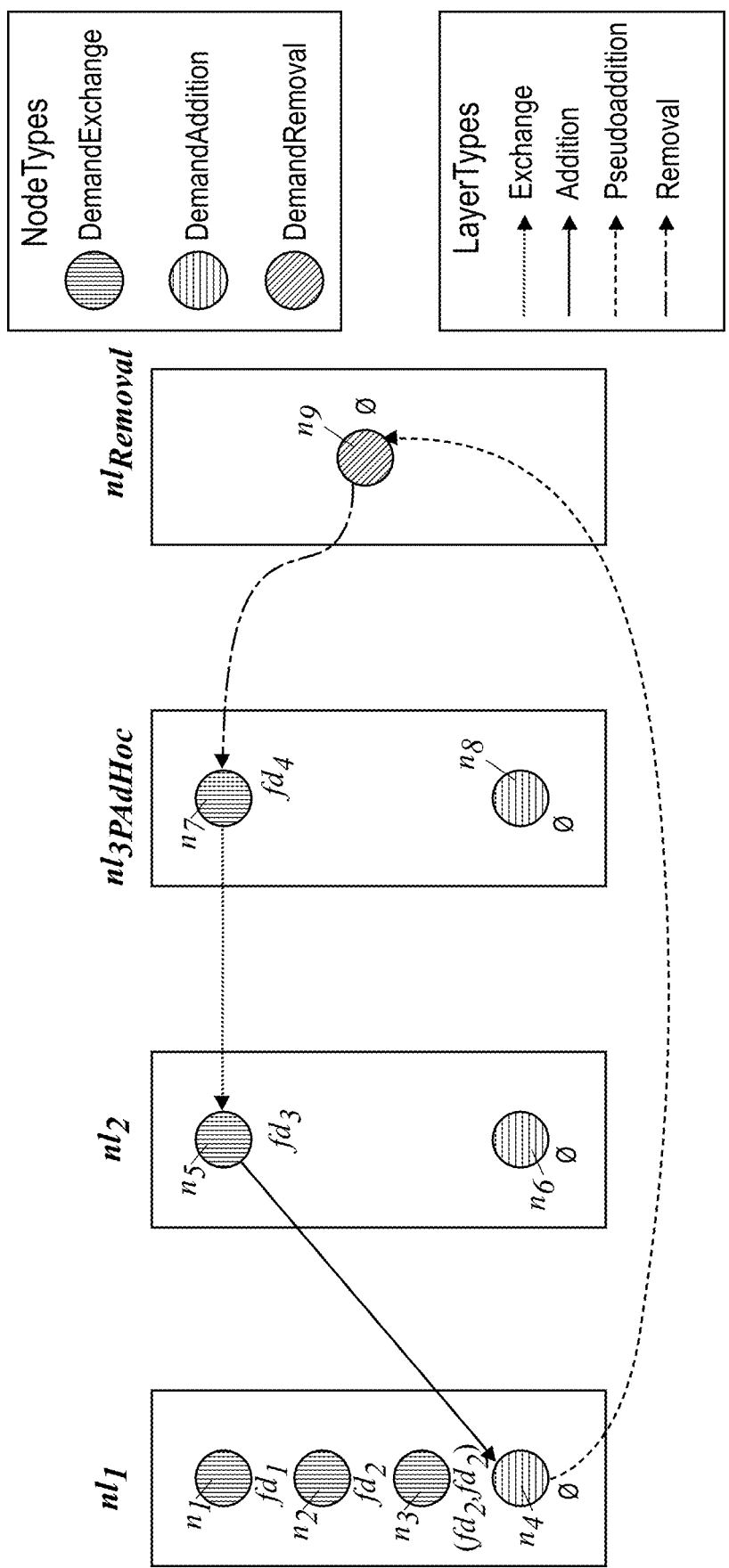

NCC 2 is described with reference to FIG. 8C. Referring to FIG. 8C, the various Arcs in the cycle represent:

1. Exchange arc from nl3PAdHoc to nl2: Addition of Node n7 to NodeLayer nl2 and removal of Node n5 from NodeLayer nl2
2. Addition arc from nl2 to nl1: Addition of Node n5 to NodeLayer nl1 without removing any Node from nl1
3. PseudoAddition arc nl1 to nlRemoval: No addition or removal of Nodes
4. Removal arc from nlRemoval to nl3PAdhoc: No addition but the removal of Node n7 from NodeLayer nl3PAdHoc.

The resulting solution for the improvement problem is as follows:
Ar1 serves fd1, fd2, fd3
Ar2 serves fd4
Ar3PAdHoc does not serve any flight demand.

The example graph data model illustrated in the FIGS. and the examples of NCCs that can be found by performing neighborhood searching of the graph data model are used for illustrated purposes, and it should be appreciated that an actual graph data model constructed by an improvement algorithm of an embodiment would likely be significantly larger than the one illustrated and that the neighborhood searching that is iteratively performed to find NCCs would likely find significantly more NCCs than illustrated and described. More generally, it should be appreciated that these relatively simple examples were provided to help explain the concepts of the embodiments described herein, and that pictorially illustrating an actual graph data model constructed using the improvement algorithm would be difficult because the graph data model would be too large to effectively illustrate.

It should be appreciated from the above discussion that embodiments of the present technology described provide a technical solution to a technical problem related to how to construct a schedule for one or more specific days in the future (aka a date or dates), wherein the schedule needs to assign respective aircraft to respective aircraft routes, assign respective crew members to the respective aircraft routes or flight legs thereof, to satisfy the flight demands of the customers while satisfying numerous constraints related to aircraft, crew members, and customers, while also optimizing specified objectives. Many manners for attempting to solve the above described technical problem are computationally intractable, i.e., NP hard. Other manners for attempting to solve the above described technical problem may require massive amounts of computational resources and require many hours (e.g., 8 hours or more) to construct a schedule that meets (aka satisfies) all the aforementioned demands and constraints while also optimizing specified objectives. A further technical problem, to which embodiments of the present technology provide a technical solution, is related to an on-demand private aviation operator needing to recover from inevitable disruptions to a previously constructed schedule in near real-time while still satisfying the flight demands of the customers, satisfying the numerous constraints related to aircraft, crew members, and customers, while also optimizing the specified objectives.

Figure 9:
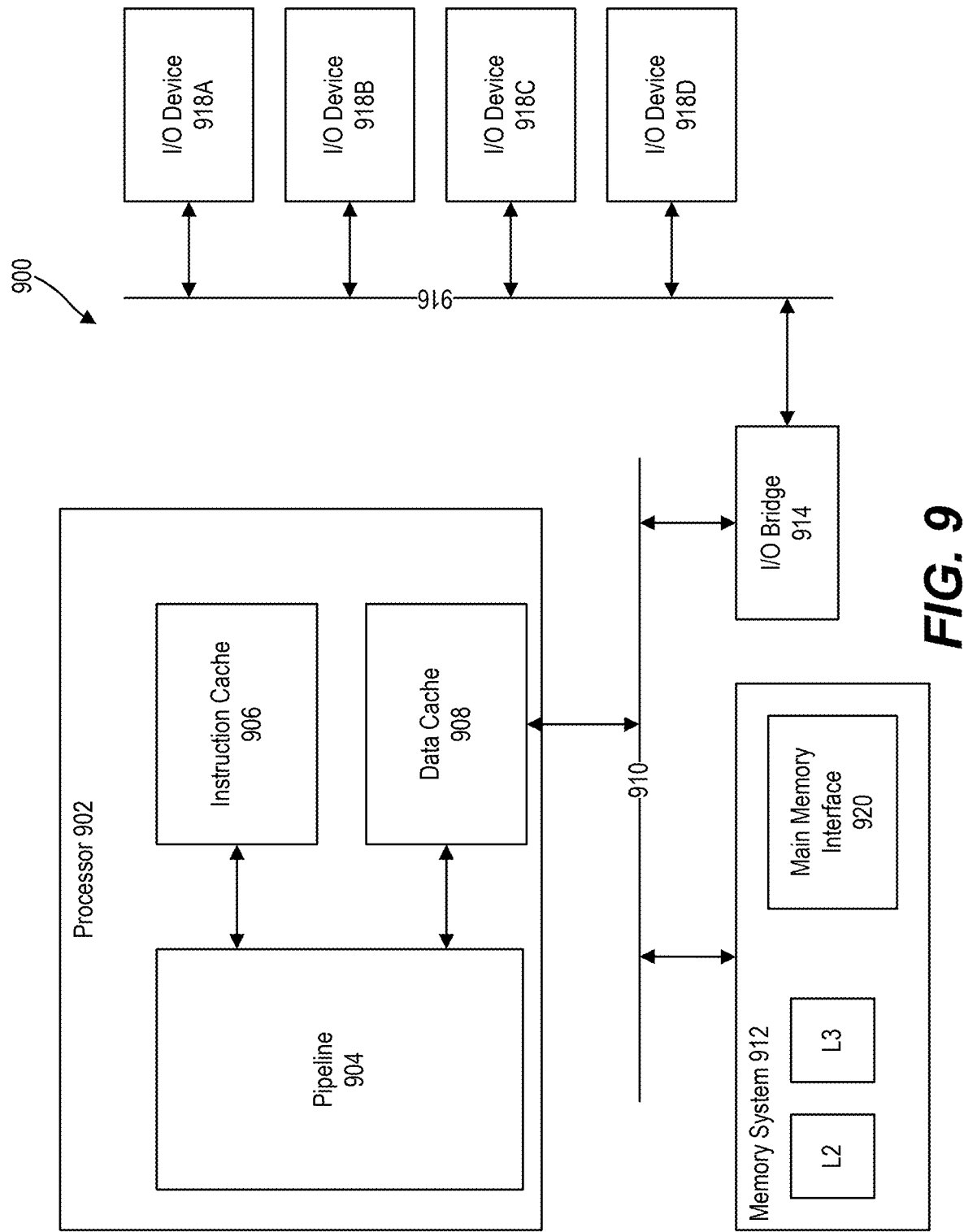
FIG. 9 illustrates an example of a computing system with which embodiments disclosed herein may be implemented.
Figure 10:
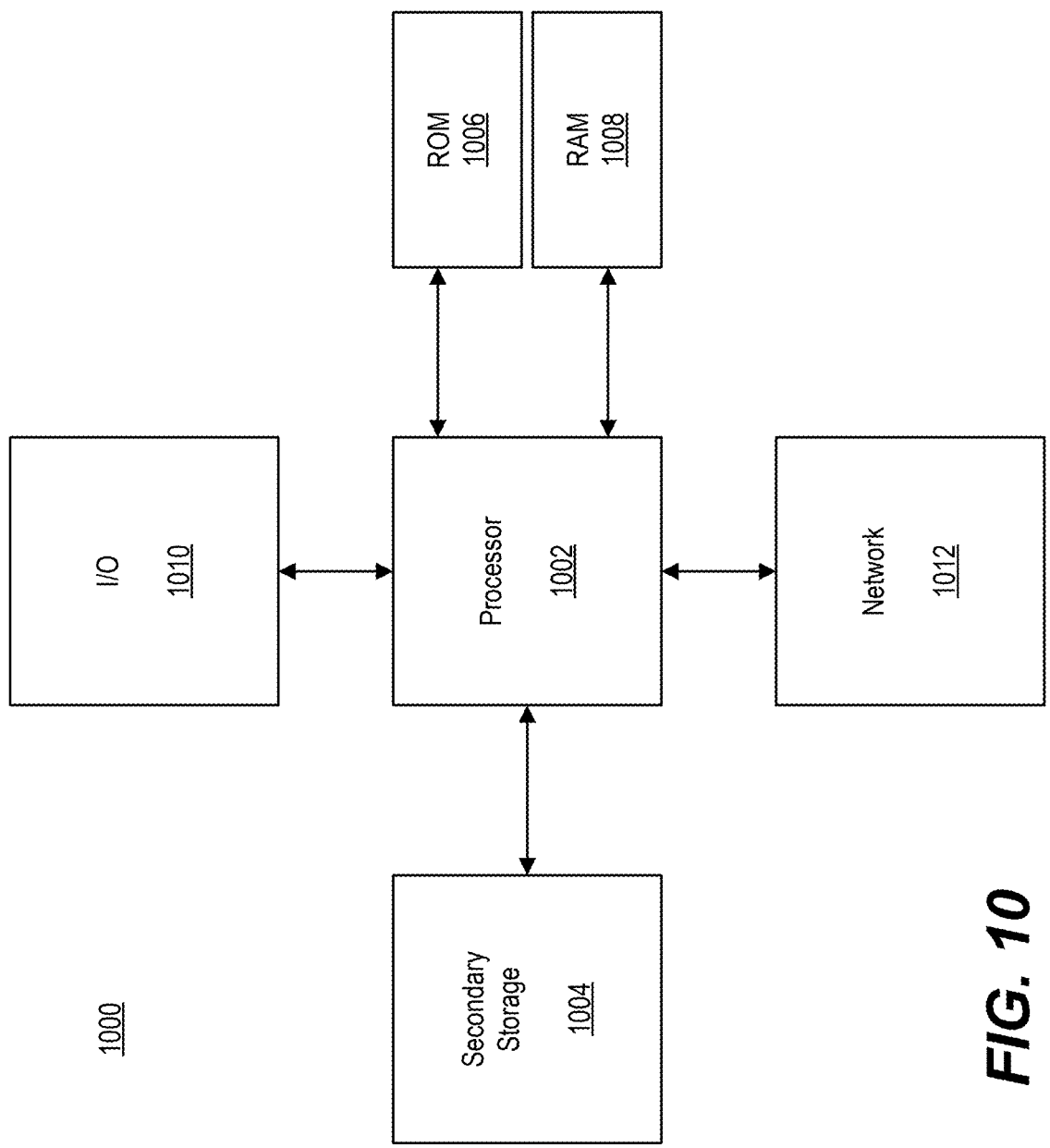
FIG. 10 illustrates a schematic diagram of a general-purpose network component or computer system with which embodiments of the present disclosure may be implemented.

FIGS. 9 and 10 illustrate example hardware devices suitable for implementing embodiments of present disclosure described herein.

FIG. 9 shows an example of a computing system 900 with which embodiments disclosed herein may be implemented. For example, the computing system 900 can be used to implement the schedule construction and improvement platform 112 (in FIG. 1), and more generally, can be used to execute the construction algorithm and the improvement algorithm described above, but not limited thereto. The computing system 900 includes at least one processor 902, which could be a single central processing unit (CPU) or an arrangement of multiple processor cores of a multi-core architecture. The at least one processor 902 can be, e.g., the processor(s) 114 (in FIG. 1), or any of the other processor(s) 124 and/or 134 (in FIG. 1). In the depicted example, the processor 902 includes a pipeline 904, an instruction cache 906, and a data cache 908 (and other circuitry, not shown). The processor 902 is connected to a processor bus 910, which enables communication with an external memory system 912 and an input/output (I/O) bridge 914. The I/O bridge 914 enables communication over an I/O bus 916, with various different I/O devices 918A-918D (e.g., disk controller, network interface, display adapter, and/or user input devices such as a keyboard or mouse). Optionally, in embodiments, system 900 may include both a processor 902 and a dedicated graphics processing unit (GPU, not shown.) As understood, a GPU is a type of processing unit that enables very efficient parallel processing of data. Although GPUs may be used in a video card or the like for computer graphics, GPUs have found much broader applications.

The external memory system 912 is part of a hierarchical memory system that includes multi-level caches, including the first level (L1) instruction cache 906 and data cache 908, and any number of higher level (L2, L3, . . . ) caches within the external memory system 912. The external memory system 912 can be or include the data store 102 (in FIG. 1). Other circuitry (not shown) in the processor 902 supporting the caches 906 and 908 includes a translation lookaside buffer (TLB), various other circuitry for handling a miss in the TLB or the caches 906 and 908. For example, the TLB is used to translate an address of an instruction being fetched or data being referenced from a virtual address to a physical address, and to determine whether a copy of that address is in the instruction cache 906 or data cache 908, respectively. If so, that instruction or data can be obtained from the L1 cache. If not, that miss is handled by miss circuitry so that it may be executed from the external memory system 912. It is appreciated that the division between which level caches are within the processor 902 and which are in the external memory system 912 can differ in various examples. For example, an L1 cache and an L2 cache may both be internal and an L3 (and higher) cache could be external. The external memory system 912 also includes a main memory interface 920, which is connected to any number of memory modules (not shown) serving as main memory (e.g., Dynamic Random Access Memory modules).

FIG. 10 illustrates a schematic diagram of a general-purpose network component or computer system 1000 with which embodiments of the present disclosure may be implemented. For example, general-purpose network component or computer system 1000 can be used to implement the schedule construction and improvement platform 112 (in FIG. 1), and more generally, can be used to execute the construction algorithm and the improvement algorithm described above, but not limited thereto. FIG. 10 illustrates a schematic diagram of a general-purpose network component or computer system. The general-purpose network component or computer system 1000 includes a processor 1002 (which may be referred to as a central processor unit or CPU) that is in communication with memory devices including secondary storage 1004, and memory, such as ROM 1006 and RAM 1008, input/output (I/O) devices 1010, and a network 1012, such as the Internet or any other well-known type of network, that may include network connectively devices, such as a network interface. Although illustrated as a single processor, the processor 1002 is not so limited and may comprise multiple processors. The processor 1002 may be implemented as one or more CPU chips, cores (e.g., a multi-core processor), FPGAs, ASICs, and/or DSPs, and/or may be part of one or more ASICs. The processor 1002 may be configured to implement any of the schemes described herein. The processor 1002 may be implemented using hardware, software, or both.

The secondary storage 1004 is typically comprised of one or more disk drives or tape drives and is used for non-volatile storage of data and as an over-flow data storage device if the RAM 1008 is not large enough to hold all working data. The secondary storage 1004 may be used to store programs that are loaded into the RAM 1008 when such programs are selected for execution. The secondary storage 1004 can be or include the data store 102 (in FIG. 1). The ROM 1006 is used to store instructions and perhaps data that are read during program execution. The ROM 1006 is a non-volatile memory device that typically has a small memory capacity relative to the larger memory capacity of the secondary storage 1004. The RAM 1008 is used to store volatile data and perhaps to store instructions. Access to both the ROM 1006 and the RAM 1008 is typically faster than to the secondary storage 1404. At least one of the secondary storage 1004 or RAM 1008 may be configured to store routing tables, forwarding tables, or other tables or information disclosed herein.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus (aka system), likewise a computer that has been programmed and/or loaded with executable instructions may be viewed as a particular machine or apparatus.

The embodiments described herein can be implemented using hardware, firmware, software, or a combination of these. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed embodiments may be performed continuously and by one or more computing devices. Each step in a process may be performed by the same or different computing devices as those used in other steps, and each step need not necessarily be performed by a single computing device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs), but not limited thereto) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, certain the subject matter described herein may be implemented on a computer having a display device (e.g., a touch-sensitive display, a non-touch sensitive display monitor, but not limited thereto) for displaying information to the user and a keyboard, touch screen and/or a pointing device (e.g., a mouse, touchpad or a trackball, but not limited thereto) by which the user may provide input to the computer. Other kinds of devices may be used to provide for interaction with a user, administrator and/or manager as well; for example, feedback provided to the user, administrator and/or manager may be any form of sensory feedback (e.g., visual feedback, auditory feedback, or tactile feedback); and input from the user may be received in any form, including acoustic, speech, or tactile input, depending upon implementation.

The subject matter described herein may be implemented in a computing system that includes a back-end component (e.g., as a data server), or that includes a middleware component (e.g., an application server), or that includes a front-end component (e.g., a client computer having a graphical user interface (GUI) or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include, but are not limited to, a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

While various embodiments of the present technology have been described above, it should be understood that they have been presented by way of example, and not limitation. It will be apparent to persons skilled in the relevant art that various changes in form and detail can be made therein without departing from the spirit and scope of the technology. For example, although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein do not require the particular order shown, or sequential order, to achieve desirable results. Other embodiments may be within the scope of the following claims.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed technology. One skilled in the art will recognize that these functional building blocks can be implemented by discrete components, application specific integrated circuits, processors executing appropriate software and the like or any combination thereof.

The breadth and scope of the present technology should not be limited by any of the above-described exemplary embodiments, but should be defined only in accordance with the following claims and their equivalents.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method performed by one or more processors for constructing and modifying a schedule for an on-demand private aviation operator, the computer implemented method comprising:
    at least one of obtaining or accessing demand information including a respective flight demand for each customer of a plurality of customers that have requested to fly from a respective departure location to a respective destination location departing at a respective time and day of one or more specific days in the future;
    at least one of obtaining or accessing supply information including a respective availability for each of a plurality of aircraft and for each of a plurality of crew members on the one or more specific days in the future;
    using a construction algorithm to construct a schedule for the one or more specific days in the future that satisfies the flight demands of the customers and optimizes the schedule to achieve one or more objectives of the construction algorithm while complying with constraints related to the aircraft, the crew members, and the customers;
    wherein the schedule constructed using the construction algorithm assigns respective aircraft to respective aircraft routes each of which includes one or more flight legs, and assigns respective crew members to the respective aircraft routes or one or more of the flight legs thereof; and
    wherein each said flight leg of each of said aircraft route may be used to satisfy at least a portion of a said flight demand of a said customer; and
    on one of the one or more specific days or within a specified temporal period prior thereto, receiving an indication of a change to at least one of the supply information or the demand information that warrants a modification to the schedule, and in response thereto, using an improvement algorithm that differs from the construction algorithm to modify a portion of the schedule to achieve one or more objectives of the improvement algorithm while complying with the constraints related to the aircraft, the crew members, and the customers;
    wherein the using the improvement algorithm to modify the portion of the schedule to achieve the one or more objectives of the improvement algorithm while complying with the constraints related to the aircraft, the crew members, and the customers, includes:
        constructing a graph data model by
            generating an initial feasible solution (IFS) that can be used to satisfy a said flight demand for a said customer that is in recovery because of the change to at least one of the supply information or the demand information that warrants the modification to the schedule; and
            creating and populating node layers and nodes of a graph data model corresponding to the IFS and constructing arcs between different ones of the nodes included in different ones of the node layers, such that: each of the nodes in the graph data model corresponds to a respective flight demand, each of the node layers in the graph data model corresponds to a respective aircraft route that can be used to satisfy one or more of the flight demands, one of the nodes in the graph data model corresponds to the said flight demand that is in recovery, one of the node layers in the graph data model corresponds to an aircraft route that can be used to satisfy the said flight demand that is in recovery, and the arcs in the graph data model define links between pairs of the nodes included in different ones of the node layers;
        performing a neighborhood search on the graph data model, which includes iteratively identifying improvements in the graph data model by iteratively identifying one or more negative cost cycles (NCCs) until a specified criterion is satisfied; and
        modifying the portion of the schedule, based on results of the neighborhood search performed on the graph data model, to achieve the one or more objectives of the improvement algorithm while complying with the constraints related to the aircraft, the crew members, and the customers.

2. The method of claim 1, wherein the using the construction algorithm to construct the schedule for the one or more specific days in the future, comprises:
    performing route enumeration to produce a list of feasible aircraft routes that can be used to satisfy the flight demands of the plurality of customers on the one or more specific days using those of the plurality of aircraft available on the one or more specific days;
    performing route selection to select, from the list of feasible aircraft routes produced as a result of performing the route enumeration, a shortened list of the feasible aircraft routes that can be used to satisfy the flight demands of the plurality of customers on the one or more specific days using those of the plurality of crew members available on the one or more the specific days; and
    performing route optimization to select, from the shortened list of the feasible aircraft routes, a respective single aircraft route for each of the aircraft included in the schedule, respective crew members for each of the respective flight legs, and a respective single flight leg for each of the flight demands of the plurality of customers,
    wherein the route optimization optimizes the schedule to achieve one or more objectives of the construction algorithm while complying with the constraints related to the aircraft, the crew members, and the customers.

3. The method of claim 2, wherein one or more objectives of the construction algorithm include one or more of the following:
    maximize revenues;
    minimize costs;
    maximize profits;
    minimize flight legs that do not fly any of the customers;

minimize how many of the crew members are used to satisfy the flight demands of the plurality of customers;

minimize how many of the aircraft are used to satisfy the flight demands of the plurality of customers;

maximize customer lifetime value; and minimize delays; and wherein the one or more objectives of the improvement algorithm may include minimize changes to the schedule constructed using the construction algorithm.

4. The method of claim 1, wherein the using the improvement algorithm to modify a portion of the schedule comprises one or more of the following:

identifying a replacement aircraft to replace one of the aircraft that became at least one of grounded, delayed, or infeasible;

identifying a replacement crew member to replace one of the crew members that became unavailable;

assigning an aircraft that had previously been unavailable to an aircraft route;

assigning a crew member that had previously been unavailable to an aircraft route or one or more flight legs thereof;

canceling an aircraft route or one or more flight legs thereof that became unnecessary;

canceling an assignment for at least one of the crew members that became unnecessary;

swapping assignments for at least some of the crew members;

swapping assignments for at least some of the aircraft; or assigning at least one of the flight demands for at least one of the customers to at least one third party aircraft.

5. The method of claim 1, further comprising:

after the construction algorithm has been used to construct the schedule for the one or more specific days in the future, and at least the specified temporal period prior to at least one of the one or more specific days in the future, causing providing to each respective customer of the plurality of customers respective information about the respective flight leg that has been scheduled to fly the customer from the respective departure location to the respective destination location on at least one of the one or more specific days; and after the improvement algorithm has been used to modify a portion of the schedule, causing providing to each respective customer whose respective flight leg has been changed as a result of the using the improvement algorithm, respective updated information about an updated respective flight leg that has been scheduled to fly the customer from the respective departure location to the respective destination location on at least one of the one or more specific days.

6. The method of claim 5, further comprising:

after the construction algorithm has been used to construct the schedule for the one or more specific days in the future, and at least the specified temporal period prior to at least one of the one or more specific days in the future, causing providing, to each respective crew member of the plurality of crew members that are included on the schedule, information about the respective aircraft route or one or more flight legs thereof to which the crew member has been assigned; and after the improvement algorithm has been used to modify a portion of the schedule, causing providing to each respective crew member of the plurality of crew members whose respective aircraft route or one or more flight legs thereof has been changed as a result of the using the improvement algorithm, respective updated information about an updated aircraft route or one or more flight legs thereof to which the crew member has been assigned.

7. The method of claim 1, further comprising:

at multiple times preceding the specified temporal period prior to the one or more specific days, between which times the demand information and the supply information are updated, using the construction algorithm to construct prior versions of the schedule for the one or more specific days in the future and causing displaying of at least a portion of one or more of the prior versions of the schedule to a representative of the on-demand private aviation operator along with information related to the one or more objectives of the construction algorithm; and allowing the representative of the on-demand private aviation operator to lock-in one or more portions of one or more prior versions of the schedule such that the one or more portions that are locked-in by the representative of the on-demand private aviation operator are included in the schedule for the one or more specific days in the future.

8. The method of claim 1, wherein the constraints related to the aircraft, the crew members, and the customers include hard constraints and optionally also include one or more soft constraints.

9. The method of claim 1, wherein the specified criterion comprises at least one of the following:

no further NCC is identified; or an iterative improvement provided by a most recently identified NCC is below a specified threshold.

10. The method of claim 1, wherein the specified criterion comprises at least one of the following:

a specified number of iterations of the neighborhood search have already occurred; or a specified time limit for performing the neighborhood search has already occurred.

11. A system for constructing and modifying a schedule for an on-demand private aviation operator, the system comprising:

a data store that stores demand information and supply information, the demand information including a respective flight demand for each customer of a plurality of customers that have requested to fly from a respective departure location to a respective destination location departing at a respective time and day of one or more specific days in the future, and the supply information including a respective availability for each of a plurality of aircraft and for each of a plurality of crew members on the one or more specific days in the future;

one or more processors interfaced with the data store and configured to:

construct a schedule, using a construction algorithm, for the one or more specific days in the future that satisfies the flight demands of the customers and optimizes the schedule to achieve one or more objectives of the construction algorithm while complying with constraints related to the aircraft, the crew members, and the customers;

wherein the schedule constructed using the construction algorithm assigns respective aircraft to respective aircraft routes each of which includes one or more flight legs, and assigns respective crew members to the respective aircraft routes or one or more of the flight legs thereof; and wherein each said flight leg of each said aircraft route may be used to satisfy at least a portion of a said flight demand of a said customer; and on one of the one or more specific days or within a specified temporal period prior thereto, in response to receiving an indication of a change to at least one of the supply information or the demand information that warrants a modification to the schedule, use an improvement algorithm that differs from the construction algorithm to modify a portion of the schedule to achieve one or more objectives of the improvement algorithm while complying with the constraints related to the aircraft, the crew members, and the customers;

wherein to use of the improvement algorithm to modify the portion of the schedule to achieve the one or more objectives of the improvement algorithm while complying with the constraints related to the aircraft, the crew members, and the customers, the one or more processors are configured to:

construct a graph data model by
  generating an initial feasible solution (IFS) that can be used to satisfy a said flight demand for a said customer that is in recovery because of the change to at least one of the supply information or the demand information that warrants the modification to the schedule; and
  creating and populating node layers and nodes of a graph data model corresponding to the IFS and constructing arcs between different ones of the nodes included in different ones of the node layers, such that: each of the nodes in the graph data model corresponds to a respective flight demand, each of the node layers in the graph data model corresponds to a respective aircraft route that can be used to satisfy one or more of the flight demands, one of the nodes in the graph data model corresponds to the said flight demand that is in recovery, one of the node layers in the graph data model corresponds to an aircraft route that can be used to satisfy the said flight demand that is in recovery, and the arcs in the graph data model define links between pairs of the nodes included in different ones of the node layers;

perform a neighborhood search on the graph data model, which includes iteratively identifying improvements in the graph data model by iteratively identifying one or more negative cost cycles (NCCs) until a specified criterion is satisfied; and modify the portion of the schedule, based on results of the neighborhood search performed on the graph data model, to achieve the one or more objectives of the improvement algorithm while complying with the constraints related to the aircraft, the crew members, and the customers.

12. The system of claim 11, wherein to use the construction algorithm to construct the schedule for the one or more specific days in the future, the one or more processors are configured to:

perform route enumeration to produce a list of feasible aircraft routes that can be used to satisfy the flight demands of the plurality of customers on the one or more specific days using those of the plurality of aircraft available on the one or more specific days;

perform route selection to select, from the list of feasible aircraft routes produced as a result of performing the route enumeration, a shortened list of the feasible aircraft routes that can be used to satisfy the flight demands of the plurality of customers on the one or more specific days using those of the plurality of crew members available on the one or more the specific days; and perform route optimization to select, from the shortened list of the feasible aircraft routes, a respective single aircraft route for each of the aircraft included in the schedule, respective crew members for each of the respective flight legs, and a respective single flight leg for each of the flight demands of the plurality of customers, wherein the route optimization optimizes the schedule to achieve the one or more objectives of the construction algorithm while complying with the constraints related to the aircraft, the crew members, and the customers.

13. The system of claim 12, wherein the one or more objectives of the construction algorithm include one or more of the following:

maximize revenues;
minimize costs;
maximize profits;
minimize flight legs that do not fly any of the customers;
minimize how many of the crew members are used to satisfy the flight demands of the plurality of customers;
minimize how many of the aircraft are used to satisfy the flight demands of the plurality of customers;
maximize customer lifetime value; and
minimize delays; and
wherein the one or more objectives of the improvement algorithm may include minimize changes to the schedule constructed using the construction algorithm.

14. The system of claim 11, wherein to use the improvement algorithm to modify a portion of the schedule, the one or more processors are configured to do one or more of the following:

identify a replacement aircraft to replace one of the aircraft that became at least one of grounded, delayed, or infeasible;
identify a replacement crew member to replace one of the crew members that became unavailable;
assign an aircraft that had previously been unavailable to an aircraft route;
assign a crew member that had previously been unavailable to an aircraft route or one or more flight legs thereof;
cancel an aircraft route or one or more flight legs thereof that became unnecessary;
cancel an assignment for at least one of the crew members that became unnecessary;
swap assignments for at least some of the crew members;
swap assignments for at least some of the aircraft; or
assign at least one of the flight demands for at least one of the customers to at least one third party aircraft.

15. The system of claim 11, wherein the one or more processors are further configured to:

after the construction algorithm has been used to construct the schedule for the one or more specific days in the future, and at least the specified temporal period prior to at least one of the one or more specific days in the future, cause to be provided to each respective customer of the plurality of customers respective information about the respective flight leg that has been scheduled to fly the customer from the respective departure location to the respective destination location on at least one of the one or more specific days; and after the improvement algorithm has been used to modify a portion of the schedule, cause to be provided to each respective customer whose respective flight leg has been changed as a result of the using the improvement algorithm, respective updated information about an updated respective flight leg that has been scheduled to fly the customer from the respective departure location to the respective destination location on at least one of the one or more specific days.

16. The system of claim 15, wherein the one or more processors are further configured to:

after the construction algorithm has been used to construct the schedule for the one or more specific days in the future, and at least the specified temporal period prior to at least one of the one or more specific days in the future, cause to be provided to each respective crew member of the plurality of crew members that are included on the schedule, information about the respective aircraft route or one or more flight legs thereof to which the crew member has been assigned; and after the improvement algorithm has been used to modify a portion of the schedule, cause to be provided to each respective crew member of the plurality of crew members whose respective aircraft route or one or more flight legs thereof has been changed as a result of the using the improvement algorithm, respective updated information about an updated aircraft route or one or more flight legs thereof to which the crew member has been assigned.

17. The system of claim 11, wherein the one or more processors are further configured to:

at multiple times preceding the specified temporal period prior to the one or more specific days, between which times the demand information and the supply information are updated, use the construction algorithm to construct prior versions of the schedule for the one or more specific days in the future and causing displaying of at least a portion of one or more of the prior versions of the schedule to a representative of the on-demand private aviation operator along with information related to the one or more objectives of the construction algorithm; and allow the representative of the on-demand private aviation operator to lock-in one or more portions of one or more prior versions of the schedule such that the one or more portions that are locked-in by the representative of the on-demand private aviation operator are included in the schedule for the one or more specific days in the future.

18. The system of claim 11, wherein the constraints related to the aircraft, the crew members, and the customers include hard constraints and optionally also include one or more soft constraints.

19. The system of claim 11, wherein the specified criterion comprises at least one of the following:

no further NCC is identified; or an iterative improvement provided by a most recently identified NCC is below a specified threshold.

20. The system of claim 11, wherein the specified criterion comprises at least one of the following:

a specified number of iterations of the neighborhood search have already occurred; or a specified time limit for performing the neighborhood search has already occurred.

21. A non-transitory computer readable medium comprising a plurality of instructions stored thereon and executable by at least one processor, the plurality of instructions for constructing and modifying a schedule for an on-demand private aviation operator, the plurality of instructions comprising:

instructions for at least one of obtaining or accessing demand information including a respective flight demand for each customer of a plurality of customers that have requested to fly from a respective departure location to a respective destination location departing at a respective time and day of one or more specific days in the future;

instructions for at least one of obtaining or accessing supply information including a respective availability for each of a plurality of aircraft and for each of a plurality of crew members on the one or more specific days in the future;

instructions for using a construction algorithm to construct a schedule for the one or more specific days in the future that satisfies the flight demands of the customers and optimizes the schedule to achieve one or more objectives of the construction algorithm while complying with constraints related to the aircraft, the crew members, and the customers;

wherein the schedule constructed using the construction algorithm assigns respective aircraft to respective aircraft routes each of which includes one or more flight legs, and assigns respective crew members to the respective aircraft routes or one or more of the flight legs thereof; and wherein each said flight leg of each said aircraft route may be used to satisfy at least a portion of a said flight demand of a said customer; and instructions for, on one of the one or more specific days or within a specified temporal period prior thereto, receiving an indication of a change to at least one of the supply information or the demand information that warrants a modification to the schedule, and in response thereto, using an improvement algorithm that differs from the construction algorithm to modify a portion of the schedule to achieve one or more objectives of the improvement algorithm while complying with the constraints related to the aircraft, the crew members, and the customers;

wherein the instructions for using the improvement algorithm to modify the portion of the schedule to achieve the one or more objectives of the improvement algorithm while complying with the constraints related to the aircraft, the crew members, and the customers, includes instructions for:

constructing a graph data model by generating an initial feasible solution (IFS) that can be used to satisfy a said flight demand for a said customer that is in recovery because of the change to at least one of the supply information or the demand information that warrants the modification to the schedule; and creating and populating node layers and nodes of a graph data model corresponding to the IFS and constructing arcs between different ones of the nodes included in different ones of the node layers, such that: each of the nodes in the graph data model corresponds to a respective flight demand, each of the node layers in the graph data model corresponds to a respective aircraft route that can be used to satisfy one or more of the flight demands, one of the nodes in the graph data model corresponds to the said flight demand that is in recovery, one of the node layers in the graph data model corresponds to an aircraft route that can be used to satisfy the said flight demand that is in recovery, and the arcs in the graph data model define links between pairs of the nodes included in different ones of the node layers;

performing a neighborhood search on the graph data model, which includes iteratively identifying improvements in the graph data model by iteratively identifying one or more negative cost cycles (NCCs) until a specified criterion is satisfied; and modifying the portion of the schedule, based on results of the neighborhood search performed on the graph data model, to achieve the one or more objectives of the improvement algorithm while complying with the constraints related to the aircraft, the crew members, and the customers.

* * * * *